US006438720B1

(12) United States Patent
Boutaud et al.

(10) Patent No.: US 6,438,720 B1
(45) Date of Patent: Aug. 20, 2002

(54) HOST PORT INTERFACE

(75) Inventors: Frederic Boutaud, Roquefort les Pins (FR); Jason Jones, Houston, TX (US); Marc Couvrat, St. Laurent du Var; Oliver Mougenot, Tourrettes sur Loup, both of (FR); Mansoor A. Chishtie, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/488,394

(22) Filed: Jun. 7, 1995

(51) Int. Cl.⁷ ........................... G01R 31/28; G06F 11/00
(52) U.S. Cl. ........................ 714/724; 714/798
(58) Field of Search ............................... 371/47.1, 22.1, 371/27, 57.2; 370/13, 58.1, 58.2, 53, 91, 241, 242, 244, 369, 375; 395/550, 555, 556

(56) References Cited

U.S. PATENT DOCUMENTS

| | | | | |
|---|---|---|---|---|
| 4,027,283 A | * | 5/1977 | Tang | 371/47.1 |
| 4,203,543 A | * | 5/1980 | Staiger | 371/24 |
| 5,166,604 A | * | 11/1992 | Ahanin et al. | 371/22.6 |
| 5,412,663 A | * | 5/1995 | Kromer et al. | 371/22.1 |

OTHER PUBLICATIONS

TMS320C56/C57 *Electrical Specifications*, Preliminary Data, SPRS029, Texas Instruments, Jul. 14, 1994, pp. 1–13.

* cited by examiner

Primary Examiner—Christine T. Tu
(74) Attorney, Agent, or Firm—Robert D. Marshall, Jr.; W. James Brady, III; Frederic J. Telecky, Jr.

(57) ABSTRACT

A circuit for interfacing a processor with a host processor is provided that has a memory associated with the processor that is selectively accessible by either both the processors or by the host processor, a plurality of storage devices selectively interconnectable with the memory and host processor, and a logic circuit interconnected with the storage devices and processors for interconnecting at least a portion of the storage devices to the memory in response to signals from the processors. An integrated circuit is provided that has a microprocessor, a memory associated with said processor that is selectively accessible by said microprocessor or a host processor, a plurality of storage devices selectively interconnectable with said memory and said host processor, and a logic circuit interconnected with said storage devices and interconnectable with said processors for interconnecting at least a portion of said storage devices to said memory in response to signals from said processors.

1 Claim, 19 Drawing Sheets

| 259 | 258 | 257 | 256 | 255 | 254 | 253 | 252 | 251 | 250 |
|---|---|---|---|---|---|---|---|---|---|
| 15-12 | 11 | 10 | 9 | 8 | 7-4 | 3 | 2 | 1 | 0 |
| RESR. | HINT | DSPINT | SMODE | BOB | RESR. | HINT | DSPINT | SMODE | BOB |

HOST PORT INTERFACE

TECHNICAL FIELD OF THE INVENTION

The present invention relates to the field of electronic circuitry, and more particularly, to electronic circuitry for interfacing a microprocessor with a microcontroller or another microprocessor.

BACKGROUND OF THE INVENTION

Many different types of microprocessors and microcontrollers are often combined with other types of circuitry in a single circuit in an attempt to provide specialized microprocessor circuitry capable of efficiently executing a preselected set of functions. For example, a general purpose microcontroller or microprocessor may be used to oversee and control the general operations of the circuitry, while a general purpose or specialized digital signal processor may be employed to perform special signal processing functions, such as, for example, data compression or decompression, data encryption or decryption, and signal modulation or demodulation. Many different methods may be employed to allow for interconnection between such a microcontroller or microprocessor (e.g. a host processor) and a digital signal processor which allow the digital signal processor to perform its functions under the control of the host processor. For some circumstances the host processor may also be a digital signal processor.

One such method is to provide a so-called host port connection between the host processor and the digital signal processor. Such a host port connection typically allows for the interchange of data and/or program code between the two processors. However, the currently known and used host ports are not designed to effectively interconnect a wide variety of processors or to provide performance of selected functions in a power efficient manner or with a minimized chip or layout size.

Thus, there are still unmet needs for circuitry capable of interfacing a microprocessor with a host microprocessor in more a efficient and/or effective manner.

SUMMARY OF THE INVENTION

According to one aspect of the present invention, a circuit for interfacing a microprocessor with a host microprocessor in an efficient and effective manner is provided. In a presently preferred embodiment, a circuit for interfacing a processor with a host processor has a memory associated with said processor that is selectively accessible by both said processors or by said host processor, a plurality of storage devices selectively interconnectable with said memory and said host processor, and a logic circuit interconnected with said storage devices and processors for interconnecting at least a portion of said storage devices to said memory in response to signals from said processors.

The present invention provides circuitry for interfacing a processor with a host processor and which circuitry has clock circuitry for generating clock signals synchronous with clock signals from said processor and for generating clock signals based on signals from said host processor that are asynchronous with said clock signals from said processor, first logic circuitry clocked by said synchronous clock signals for generating synchronous memory access control signals, second logic circuitry clocked by said asynchronous clock signals for generating asynchronous memory access control signals, and a register for storing preselected control signals.

The present invention provides circuitry for interfacing a microprocessor with a host microprocessor, which circuitry has a memory accessible by said microprocessors, a memory interface circuit interconnected with said memory, a plurality of data latches interconnectable with said memory interface, a plurality of address registers interconnectable with said memory interface, a control register for storing preselected control signals, a bus interconnected with said latches, said registers, and said host processor, and a control circuit interconnected with said latches, registers, bus and control register for appropriately interconnecting said latches or registers to said memory in response to control signals from said processor or said host processor.

The present invention provides circuitry for controlling the testing of a circuit having portions using either synchronous or asynchronous clock signals having a first multiplexer for selectively providing said synchronous clock signal or a test clock signal to said portion of said circuit using said synchronous clock signal, and a second multiplexer for selectively providing the output from said first multiplexer or said asynchronous clock signal to said portion of said circuit using said asynchronous clock signal.

The present invention provides an integrated circuit having a microprocessor, a memory associated with said processor that is selectively accessible by said microprocessor or a host processor, a plurality of storage devices selectively interconnectable with said memory and said host processor, and a logic circuit interconnected with said storage devices and interconnectable with said processors for interconnecting at least a portion of said storage devices to said memory in response to appropriate signals from said processors.

The present invention provides circuitry for interfacing a processor with a host processor.

The present invention also provides a system for controlling the testing of a circuit having portions using either synchronous or asynchronous clock signals.

BRIEF DESCRIPTION OF THE DRAWINGS

For a more complete understanding of the present invention, and the advantages thereof, reference is now made to the following detailed description taken in conjunction with the accompanying drawings, in which:

FIGS. 11A–11J depict detailed circuitry for the functional blocks of the host port circuit depicted in FIG. 9.

DETAILED DESCRIPTION OF THE INVENTION

The present invention provides host port interface circuits for a microprocessor that handle communications between the microprocessor with the host port and a microcontroller or a microprocessor, e.g. a host microprocessor. Preferably, the microprocessor with the host port has memory associated with it that the host port may use during its communications.

Figure 1:
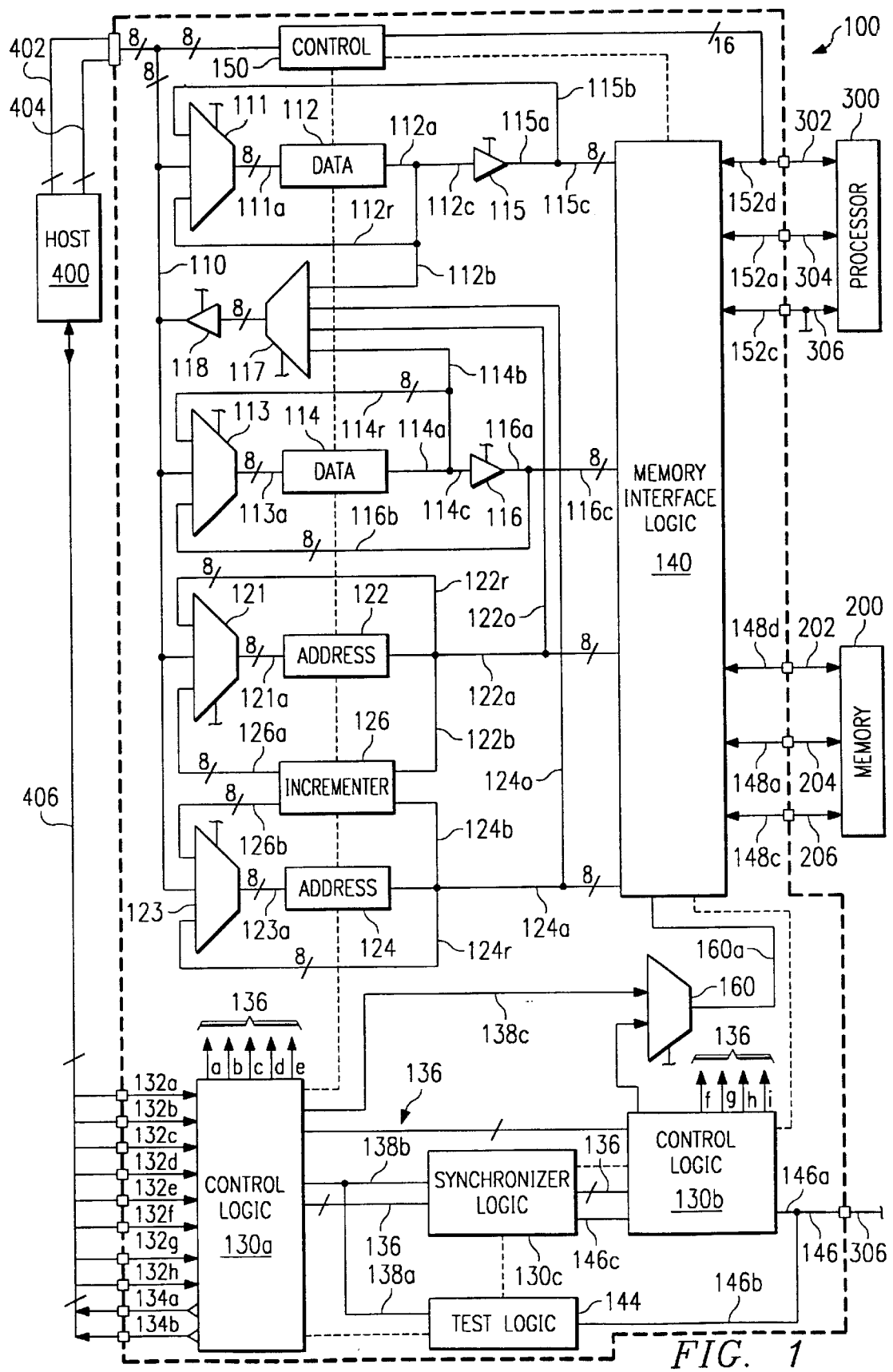
FIG. 1 depicts a simplified block diagram of the internal architecture of a host port interface circuit of the present invention interconnected with a processor, processor memory and a host processor.

Referring now to FIG. 1, there may be seen a simplified block diagram of the internal architecture of a host port 100 of the present invention interconnected with a microprocessor memory 200, a microprocessor 300 and a host microprocessor 400. More particularly, it may be seen that the host port, host port interface (HPI) or circuit 100 of the present invention includes a multibit multiplexed data bus 402 and an address bus 404 from the host microprocessor 400 connected to circuit 100 via input/output pins (not shown).

The address and data bus input/output pins are connected to an internal multi-bit multiplexed data and address bus 110. Alternatively, the multiplexed data and address bus 402, 404 of host processor 400 and internal multiplexed data and address bus 110 may be separated into an external and internal multi-bit data bus and an external and internal multi-bit address bus. Although not depicted in FIG. 1, the host address bus 404 may be appropriately interconnected to the address portion of internal bus 110 when the address and data portions of internal bus are separated. In addition to the host data and address bus 402,404, the circuit 100 is connected to a multiple signal control bus 406 associated with the host processor 400.

The circuit 100 is also connected to the memory 200 via preferably separate internal data 148d, address 148a, and control 148c buses that appropriately connect with corresponding inputs/outputs 202, 204, 206, respectively, of memory 200. Similarly, the circuit 100 is connected to the microprocessor 300 via separate internal data 152d, address 152a, and control 152c buses that appropriately connect with corresponding inputs/outputs of microprocessor 300, e.g. data bus 302, address bus 304, and control bus 306. Although not depicted in FIG. 1, microprocessor 300 may, in certain circumstances, have its own separate and distinct set of such buses interconnected with memory 200. Preferably, memory 200 is on-chip memory with microprocessor 300; microprocessor 300 is preferably a digital signal processor (DSP) and most preferably a Texas Instruments TMS320C5x DSP.

Continuing to refer to FIG. 1, the internal multiplexed bus 110 in turn is connected to various internal latches and registers via various input multiplexers; these latches and registers are a pair of data latches 112, 114, a pair of address register 122, 124, and a control register 150. Although latches and registers are the preferred storage devices, dearly other types of storage devices may be so employed. Input multiplexers 111, 113 are associated with the data latches 112, 114, respectively, input multiplexers 121, 123 are associated with the address registers 122, 124, respectively. As depicted in FIG. 1, control register 150 has no input multiplexer associated therewith Thus, the bus 110 serves as communication circuitry for carrying communications to and from the various components of circuit 100 and host 400.

Again, the multiplexed data and address bus 110 may be separated into an individual internal multi-bit data bus 110d (not shown) connected to the input multiplexers 111, 113 and control register 150 and data input/output pins, and, an individual internal multi-bit address bus 110a (not shown) connected to input multiplexers 121, 123 and suitable address input/output pins. In addition, it may be seen that the circuit 100 includes a control logic portion 130 (e.g. control logic portion 130a, control logic portion 130b, and synchronizer logic portion. 130c), a memory interface logic portion 140 and a test logic portion 144. Test logic 144 is connected to all the other blocks, registers, and latches of circuit 100 by the smaller dashed lines to allow for scanning of test data into or out of all these elements of circuit 100 for testability purposes. All of the functional blocks or circuitry depicted in circuit 100 are fully static, are operable from any preselected operational clock speed down to virtually DC, and retain their states without any clock signal.

Data from the host 400 may be transferred in parallel from data bus 402, or address bus 404, to the input/output pins of circuit 100 where it passes onto the multiple lines of internal bus 110. Internal bus 110 connects directly to control register 150 and serves as one input to the input multiplexer pairs 111 and 113, and 121 and 123. Again, the multiplexed data and address bus 110 may be an individual internal multi-bit data bus 110d connected to the input multiplexers 111, 113 and control register 150 and data input/output pins, and an individual internal multi-bit address bus 110a connected to input multiplexers 121, 123 and address input/output pins.

Thus, although FIG. 1, for ease of depiction purposes, only depicts a single input multiplexer 111 and a singe data latch 112, there are preferably eight such input multiplexers, one for each of the preferably eight internal bus lines, and either eight data latches or an eight bit wide data latch. Similarly, the other input multiplexers 113, 121, 123 and latches 114 and registers 122, 124 may be either eight bits wide or eight single bit units. Other numbers of bits may be so employed for the data latches and multiplexers, or other numbers of data latches and multiplexers may be so employed and still be within the scope of the present invention. These inputs selectively pass through the input multiplexers based upon control signals generated by control logic 130.

More particularly, the data inputs from the bus 110 are provided to the input multiplexers, represented by multiplexer 111, as one of its inputs, and if the control logic 130 generates appropriate control signals 136 for this multiplexer(s), this input is output from multiplexer 111 on line 111a and is available as an input for data latch 112. Data latch 112 is preferably a scannable register latch (SRL), but other types of latches may be so employed. The data is clocked into latch 112 via a clock signal provided to latch 112 by control logic 130. For ease of depiction purposes, FIG. 1 generally does not depict the control or clock lines between control logic 130 and the remaining portions of circuit 100. Again, the multiplexed data and address bus 110 may alternatively be an individual internal multi-bit data bus 110d connected to input multiplexer 111 and an individual internal multi-bit address bus.

The data may be stored in latch 112 until it is provided as an output on output line 112a. As an output it may be provided as one input to output multiplexer 117, via line 112b, as an input to tristatable output driver 115, via line 112c, or as a refresh input to latch 112, via line 112r and input multiplexer 111 and line 111a. Preferably, the clock signals to latch 112 are not gated to provide simpler control logic 130; using non-gated clock signals results in the addition of the refresh recirculating line that uses input multiplexer 111. The normal state for input multiplexer 111 is to allow for refresh of any data in latch 112 and preferably a control signal 136 from control logic 130 is needed to operate multiplexer 111 in a different manner.

Output driver 115 is controlled by an appropriate control signal 136 from control logic 130 and outputs the data on its output line 115a. Output line 115a provides the data as an input to memory interface logic 140 via line 115c. Line 115c also provides data from the memory interface logic 140 to the data latch 112 as the other input to input multiplexer 111 via line 115b; this allows data to be written into the latches 112 from memory 200.

Memory interface logic 140 provides the data to memory 200 via an internal data bus 148d. Memory interface logic 140 also has an internal address bus 148a and an internal control bus 148c that are connected to memory 200 for providing address and control signals to the memory. In this manner, data that is received from the host 400 may be stored in memory 200 for later use by microprocessor 300 and/or the host 400.

Preferably, the host data bus 402, or address bus 404, is an eight bit wide bus and internal bus 110 is also an eight bit wide bus. Again, other bus widths may be so employed in the present invention; the bus width may be, for example, but not limited to, sixteen or thirty-two bits, e.g. powers of two, or ten or twelve bits, e.g. multiples of two, or twenty-one bits, e.g. integer values.

Thus, although FIG. 1, for ease of depiction purposes, only depicts a single input multiplexer 111 and data latch 112, there are preferably eight such input multipleoers, one for each of the preferably eight internal bus lines, and either eight data latches or a single eight bit wide data latch. Similarly, there are either eight output drivers 115 for each of the eight output lines from data latch 112 or an eight bit wide driver. Thus, data latch 112 may be used to store eight bits of data from host 400 in parallel.

In a similar manner, inputs on the bus 110 from the host 400 are also provided as one input of the other input multiplexer 113 and if the control logic 130 generates the appropriate control signal 136 this input is output from multiplexer 113 on line 113a and is input into data latch 114. Data latch 114 is also preferably a scannable register latch (SRL), but other types of latches may be so employed. The data is clocked into latch 114 via a clock signal provided to latch 114 by control logic 130. Again, for the sake of clarity, FIG. 1 generally does not depict the control or clock lines between control logic 130 and the remaining portions of circuit 100. Again, the multiplexed data and address bus 110 may alternatively be an individual internal multi-bit data bus 110d connected to input multiplexer 111 and an individual internal multi-bit address bus.

The data may be stored in latch 114 until it is provided as an output on output line 114a. As an output it may be provided as one input to output multiplexer 117, via line 114b, as an input to tristatable output driver 116, via line 114c, or as a refresh input to latch 114, via line 114r and input multiplexer 113 and line 113a. Preferably, the clock signals to latch 114 are not gated to provide simpler control logic 130; using non-gated clock signals results in the addition of the refresh recirculating line that uses input multiplexer 113. The normal state for input multiplexer 113 is to allow for refresh of any data in latch 114 and preferably a control signal from control logic 130 is needed to operate multiplexer 113 in a different manner.

Output driver 116 is controlled by an appropriate control signal 136 from control logic 130 and outputs the data on its output line 116a. Output line 116a provides the data as an input to memory interface logic 140 via line 116c. Line 116c also provides data from the memory interface logic 140 to the data latch 114 as the other input to input multiplexer 113 via line 116b; this allows data to be written into the latches 114 from memory 200. Memory interface logic 140 provides the data to memory 200 via its internal data bus 148d. In this manner, data that is received from the host 400 may be stored in memory 200 for later use by processor 300 and/or the host 400.

Again, although FIG. 1 only depicts a single input multiplexer 113, for ease of depiction purposes, there are eight such input multiplexers, one for each of the eight internal bus lines or an eight bit wide multiplexer. Similarly, there are either eight output drivers 116 for each of the eight output lines from data latch 114 or a wee eight bit wide driver; and, data latch 114 may be eight latches or an eight bit wide latch. Thus, data latch 114 may be used to store eight bits of data from host 400 in parallel.

The data in memory 200 may also be read out of a particular location (identified by the address stored in the address registers 122, 124) into both data latches 112, 114, via memory interface logic 140, lines 115c, 115b, lines 116c, 116b and input multiplexers 111, 113, respectively. The data from the latches 112, 114 is then read out of the latches 112, 114 to host 400 one latch at a time using lines 112b, 114b, output multiplexer 117, output driver 118, and bus 110. In this manner, data stored in memory 200 may be retrieved by host 400. The details of writing to and reading from memory 200 by host 400 and processor 300 is described in more detail later herein.

The data bus 148d from memory interface logic 140 is preferably a steen bit wide bus since it is connectable to both data latches 112, 114, so that sixteen bits may be moved between the memory 200 and the two eight bit wide data latches 112, 114. That is, the output lines from one data latch serve as half of the bus and the output lines from the other data latch form the remaining half of the data bus going to memory 200; as noted more fully later herein, these output lines may also serve as input lines, so the data bus 148d is bidirectional. That is, the data is read out of, or written into, both data latches 112, 114 at the same time to provide Steen bits of data to, or from, memory interface logic 140.

Memory 200 is preferably organized for storing sixteen bit length words, and processor 300 is preferably organized for utilizing sixteen bit length words. However, other word lengths may be so employed in the present invention; for example, for a twenty-four bit word an additional eight bit data latch may be added, along with the supping input and output devices described above, in parallel with the two depicted data latches 112, 114. Similarly, the length or number of the address registers 122, 124 may be increased or decreased. Again, other word lengths may be so employed in the present invention; the word length may be, for example, but not limited to, sixteen or thirty-two bits, e.g. powers of two, or ten or twelve bits, e.g. multiples of two, or twenty-one, e.g. integer values.

For the presently preferred sixteen bit word length, the circuit 100 expects all transfers to or from the host 400 to be made as two consecutive bytes. As described more fully later herein, a control signal from the host 400 is used to identify when the first or second byte is being transferred.

In a manner similar to that described earlier herein for the two data latches, FIG. 1 also depicts that data may be loaded into address register 122 (which is preferably eight bits wide), via one input of input multiplexer 121 connected to data/address bus 110, or address register 124 (which is preferably eight bits wide), via one input of input multiplexer 123 connected to data/address bus 110; multiplexers 121, 123 may each be a single eight bit wide multiplexer or eight single bit multiplexers. Again, the multiplexed data and address bus 110 may be an individual internal multi-bit data bus 110d and an individual internal multi-bit address bus 110a connected to input multiplexers 121, 123 and appropriate address input/output pins.

These inputs selectively pass through the input multiplexers 121, 123 based upon appropriate control signals 136 from control logic 130. However, for ease of illustration purposes only one of the eight input multiplexers have been depicted for each register. The address stored in the two address registers 122, 124 is provided to the memory interface logic 140 via their output lines 122a, 124a, respectively. Thus, up to sixteen bits of address information may be provided to memory 200 via internal address bus 148a.

The output lines from one address register (122 or 124) serve as half of the address bus and the output lines from the other address register (124 or 122) form the remaining half of the address bus going to memory interface 140. Although preferably unidirectional, these output lines may also serve as input lines, so that the address bus 122a, 124a may optionally be bidirectional. The address data is read out of (or written to) both address registers 122, 124 at the same time to provide an address to (or from) memory interface logic 140.

Preferably, the clock signals to address registers 122, 124 are also not gated to provide simpler control logic 130; this results in the addition of a refresh recirculating line (122r, 124r) that uses an input multiplexer (121, 123, respectively). The normal state for input multiplexer 121 (or 123) is to allow for refresh of any data in register 122 (or 124) and preferably a control signal from control logic 130 is needed to operate multiplexer 121 (or 123) in a different manner. The output of register 122 (or 124) may also be read by host 400, via line 122o (or 124o), output multiplexer 117, output driver 118, and bus 110. Host 400 may read the address in registers 122, 124 in order to determine where a data read or write will occur in memory 200, before beginning such a read or write.

Again, for the preferred sixteen bit word length, the circuit 100 expects all transfers to and from host 400 to be made as two consecutive bytes. As noted more fully later herein, a control signal from the host 400 is used to identify, when the first or second byte, whether for data or address, is being transferred. Again, other word lengths may be so employed in the present invention and if so employed, additional host control signals may be employed, if needed, to identify the bytes or bits of information; the word length may be, for example, but not limited to, sixteen or thirty-two bits, e.g. powers of two, or ten or twelve bits, e.g. multiples of two, or twenty-one, e.g. integer values.

As may also be seen from FIG. 1, the address registers 122, 124 also have an incrementer 126 associated therewith. The incrementer 126 serves to increment the address in the two address registers 122, 124 by one. This is accomplished by having the incremented address read into the address registers 122, 124 via another input line of their input multiplexers 121, 123, respectively, using incrementer output lines 126a, 126b, respectively. The existing address is provided to the incrementer 126 via output lines 122b, 124b from address registers 122, 124, respectively. The incrementer 126 may be enabled by control signals 136 from control logic 130. Further, the incrementer 126 may optionally be configured either as a decrementer, or a selectable as an incrementer or a decrementer, such selection will require a control signal from control logic 130 to the incrementer/ decrementer to identify in which mode it is to operate. As depicted in FIG. 1, the processor 300 does not have access to the address registers 122, 124.

As depicted in FIG. 1, control register 150 is connected to internal bus 110 and is also connected to the processor's data bus 302. In this manner, both the host 400 and processor 300 may write data or information into control register 150 or read the data or information in control register 150. The control register 150 operates as a steen bit register, although other register lengths may be so employed. Since register 150 is sixteen bits, host 400 may read or write two bytes to control register 150, while processor 300 may read or write sixteen bits at a time. Continuing to employ two bytes in series for host 400 simplifies the control logic 130 and its operation.

Control register 150 contains data, or information, that is used by control logic 130 to determine whether the first byte to or from host 400 goes to or is from data latch 112 or data latch 114, when the data latches are accessed, or whether the first byte to or from host 400 goes to or is from address register 122 or address register 124, when the address registers are accessed; this allows for using circuit 100 with a host 400 using either big endian or little endian words.

As also shown in FIG. 1, there is a synclronier logic circuit 130c connected to control logic 130a and control logic 130b, via multiple interconnections. Control logic 130a and 130b generate memory control signals which are inputs to the memory interface logic 140; these memory control signals are depicted as passing through a multiplexer 160. Effectively, multiplexer 160 determines which control signal is supplied to memory interface 140 based upon a control signal from control logic 130b. The synchronizer circuit 130c serves to synchronize some external host control signals on control bus 406 with internal processor 300 clock signals and vice versa; the internal clock signal for processor 300 is supplied to logic circuit 130b via line 306, and lines 146 and 146a, and logic circuit 130b supplies this processor clock signal to circuit 130c, via line 146c.

The external clock signal is supplied by host 400 to control logic 130a, or is preferably generated by control logic 130a based upon signals 132 supplied by host 400 to circuit 100. Some control signals 136 are provided to/from control logic 130b. The external clock signal is supplied to test logic circuit 144, via line 138a, and to synchronizer 130c, via line 138b.

The circuit 100 may operate in a host only mode or a shared access mode. When circuit 100 is in the host only mode there is no need to snychronise the host signals with the clock of processor 300 and the accesses by the host are asynchronous with the processor's clocks. However, when circuit 100 is in the shared mode of operation the memory accesses by the host 400 and processor 300 are synchronised to the clocks of the processor 300 to avoid conflicts in accesses to memory 200. Processor 300 may change the mode without a software handshake, even during an access by the host 400 without disrupting that host access. Thus, control logic 130*a* serves to generate appropriate memory control signals when an asynchronous operation is desired and in a simplistic sense, control logic 130*b* serves to generate synchronous memory control signals when shared operations are desired.

When the circuit 100 is in the host only mode, the control signals for circuit 100 are generated by control logic 130*a* in response to signals from the host on control bus 406, and generally, when circuit 100 is in the shared mode, (again, for initial discussion purposes) the control signals for those portions of circuit 100 that are accessible by both host 400 and processor 300 are generated by control logic 130*b*. However, even for those components capable of using either synchronous and asynchronous types of control signals, certain host accesses reman under the control of host clock signals. That is, since the processor 300 can not access the data latches 112, 114 or address latches 122, 124 the signals associated with their locking and control are asynchronous, as are the signals provided to the logic needed to move data to or from these latches.

FIG. 1 also depicts the various control signals 132*a*–132*i* supplied to control logic circuit 130*a* by the host 400 and the output signals 134*a*–134*b* supplied to the host 400 by circuit 130*a*; control signals 132*a*–132*i* and 134*a*–134*b* make up control bus 406. Some of the control signals from the host are latched by internal input latches (not depicted in FIG. 1) based upon external clock signals. Control logic circuit 130*a* provides such external clock signals on line 138 which are supplied to synchronizer logic 130*c*, via line 138*b*, to test logic 144, via line 138*a*, and also provides asynchronous memory control signals to multiplexer 160, via line 138*c*.

Control logic circuit 130 also supplies various internal control signals 136 to other portions of the circuit 100, including internal to logic circuit 130. For example, the control signals for the correct operation of the multiplexers 111, 113, 117, 121, 123, 160 in circuit 100 are provided by control logic circuit 130. In addition, the control signals for the correct operation of the output drivers 115, 116, 118 are provided by control circuit 130. Although not depicted in FIG. 1, control circuit 130 also receives selected control information from data stored in selected bit positions of control register 150.

In summary, the host port interface circuit 100 is a filly static, bi-directional, eight bit wide, parallel port used to interface an eight bit host microprocessor or microcontroller 400 to a preferably sixteen bit microprocessor 300, that is preferably a digital signal processor (DSP), and most preferably a Texas Instruments TMS320C5x DSP, via on chip memory 200 associated with processor 300. Host processor 400 may be any currently available eight bit microcontroller or microprocessor. Clearly, other widths or numbers of bit sizes for the port, host and processor may be employed and still be in accordance with the principles of the present invention. Information is exchanged between the processor 300 and the host processor 400 through preferably processor on-chip memory 200 that is accessible by both the host 400 (via circuit 100) and the processor 300.

Both devices have access to the sixteen bit control register 150. The host processor 400 addresses memory 200 via the address registers 122, 124, while the processor 300 addresses memory 200 using its address bus 304, via interface logic 140. For the presently preferred TMS320C57 DSP, memory 200 is presently preferred to be a 2K of sixteen bit word single access random access memory (RAM) block preferably addressed at 1000*h* (8800*h*) in data (program) space; dearly, other memory sizes and address locations may be so employed in the present invention. The memory 200 may also be used as a general purpose on-chip data or program single access RAM. For the TMS320C5x DSPs, such single access RAM blocks may be affected by the ROM protect feature (if it is enabled).

Continuing to refer to FIG. 1, the pins of circuit 100, their functions and connections to the pins of a host 400 will now be described. Generally, the small rectangles at the edge of the dashed line representing the outer boundaries of circuit 100 represent these pins. The eight bit data bus 402 or multiplexed address 404 and data 402 bus of host 400 are connected to Host Data (HD) pins HD0 to HD7 (not labeled in FIG. 1), which are the input/output (I/O) pins for internal bus 110; these pins may be either an input or an output so that they are bi-directional and may be placed in a high impedance state when not used for outputting. HD7 is normally the most significant bit (MSB) and HD0 is normally the least significant bit (LSB). For the preferred TMS320C5x DSPs these pins may also be placed in a high impedance when the OFF signal, which places all C5x drivers in a high impedance state, is active low.

Two address lines 404 or multiplexed address and data lines of host 400 are connected to host control (HCNTL) pins HCNTL0, HCNTL1, which are control signals or inputs 132. These pins provide the control signals 406/132 that allow a host access to select the address registers 121, 123, the data latches 112, 114 (with an optional automatic address increment), or the control register 150. The processor 300 does not have access to the data latches 112, 114 or the address registers 122, 124.

More particularly, when HCNTL0 and HCNTL1 are 0 and 0, respectively, the host can read or write the control register 150; whether an access is a read or write is determined by a read/write strobe described later herein. When HCNTL0 and HCNTL1 are 0 and 1, respectively, the host can read or write the data latches 112, 114, and the address registers are automatically post-incremented each time a read is made and pre-incremented each time a write is performed. When HCNTL0 and HCNTL1 are 1 and 0, respectively, the host can read or write the address registers 122, 124. This pair of address registers points to a specific location in the memory 200. When HCNTL0 and HCNTL1 are 1 and 1, respectively, the host can read or write the data latches 112, 114, and the address registers are not affected, e.g. no auto incrementing of the address occurs. A portion of control logic 130 uses these signals to decode the type of access by the host 400 (e.g. the transaction mode) and then generates the appropriate internal control signals to effect that access.

The auto increment feature provides a convenient way of reading or writing to subsequent word locations. In the auto increment mode, a data read causes a post increment of the address registers 122, 124 and a data write causes a pre increment of the address registers 122, 124. The register incrementer 126 uses all sixteen bits. The address registers 122, 124 form a register that is sixteen bits wide and all sixteen bits can be written to or read from. With the presently preferred 2K memory implementation, only the eleven LSB's of the address registers are needed to address the memory 200.

The read/write strobe or an address line or a multiplexed address and data line of host 400 is connected to host read/write (HR/W) pin HR/W, which is the read/write input or control signal. Hosts drive HB/W high to read circuit 100, and hosts drive HR/W low to write to circuit 100. Hosts without a read/write strobe should use an address line to perform this function.

One address line 404 or a multiplexed address and data line of host 400 is connected to host byte identification line (HBIL) pin HBIL, which is the byte identification input or control signal. That is, this control signal identifies whether a byte of data is the first or second byte.

A chip select line of host 400 is connected to pin HCS, which is the host chip select input or control signal.

A read strobe and a write strobe or a data strobe of host 400 is connected to pins HDS1, HDS2, which are the data strobe inputs or control signals. Hosts with separate read and write strobes may connect HDS1 to the read strobe and HDS2 to the write strobe. Hosts with only a data strobe may connect it to HDS1, and HDS2 may be connected to Vdd. If the host has an inverted data strobe (e.g. Motorola), HDS2 may be connected to ground and HDS1 may be connected to the inverted strobe.

The address latch enable or address strobe of host 400 is connected to pin HAS, which is the address strobe input. Hosts with multiplexed address and data lines should connect HAS to their ALE pin; the control signals HBIL, HCNTL0, HCNTL1 and HRW are internally latched in circuit 100 on the falling edge of the HAS signal. Hosts with separate address and data lines should connect HAS to Vdd; then HBIL, HCNTL0, HCNTL1 and HRW are internally latched on the filling edge of HDS1 when HAS stays high However, hosts with separate address and data lines may also use HAS, if the host drives HAS low, with sufficient setup time before HDS is used, as noted later herein.

The asynchronous ready input of host 400 is connected to pin HRDY, which is an output signal that may be placed in a high impedance state when not in use. For the preferred TMS320C5x DSPs these pins may also be placed in a high impedance when the OFF signal, which places all C5x drivers in a high impedance state, is active low.

The HRDY signal is provided to allow insertion of wait states for hosts that support an asynchronous input; this may be useful when the operating frequency of processor 300 is variable, or when the host 400 is capable of accessing at a faster rate than the maximum shared access mode access rate (up to the host only mode maximum access rate). The HRDY signal provides a convenient way to automatically (no software handshake needed) adjust the host access rate for a change in processor clock rate or a switch in the mode of circuit 100.

An interrupt for host 400 is connected to output pin HINT, which is an output signal from processor 300 that may be placed in a high impedance state when not in use and is used by the processor 300 to request an interrupt of the host 400. It is driven high when the processor 300 is being reset. For the preferred TMS320C5x DSPs these pins may also be placed in a high impedance when the OFF signal, which places all C5x drivers in a high impedance state, is active low.

The processor 300 is preferably not operational during a reset, but the host 400 may still access the circuit 100 allowing program or data downloads into memory 200. The host 400 controls the processor 300 reset operation if this feature is used The host 400 should stop accessing the circuit 100 at least six processor 300 time periods before driving the processor reset line low (or active) to allow the circuit 100 sufficient time to complete processing of an access. After driving the processor 300 into reset, the host may start accessing the circuit 100 after a minimum of four processor 300 clock cycles or periods.

The mode of operation of circuit 100 is automatically shifted to the host only mode during reset, as noted later herein, allowing high speed program download. The host 400 may then remove the reset signal and after at least twenty processor 300 periods following the reset signal edge, the host 400 may begin reaccessing the circuit 100; this number of periods corresponds to the internal reset period for the preferred TMS320C5x DSPs. Accordingly, for other microprocessors or DSPs other appropriate such time periods may be so employed and still be within the scope of the present invention. The mode of circuit 100 is automatically set to the shared access mode after a reset.

Figures 2, 6:
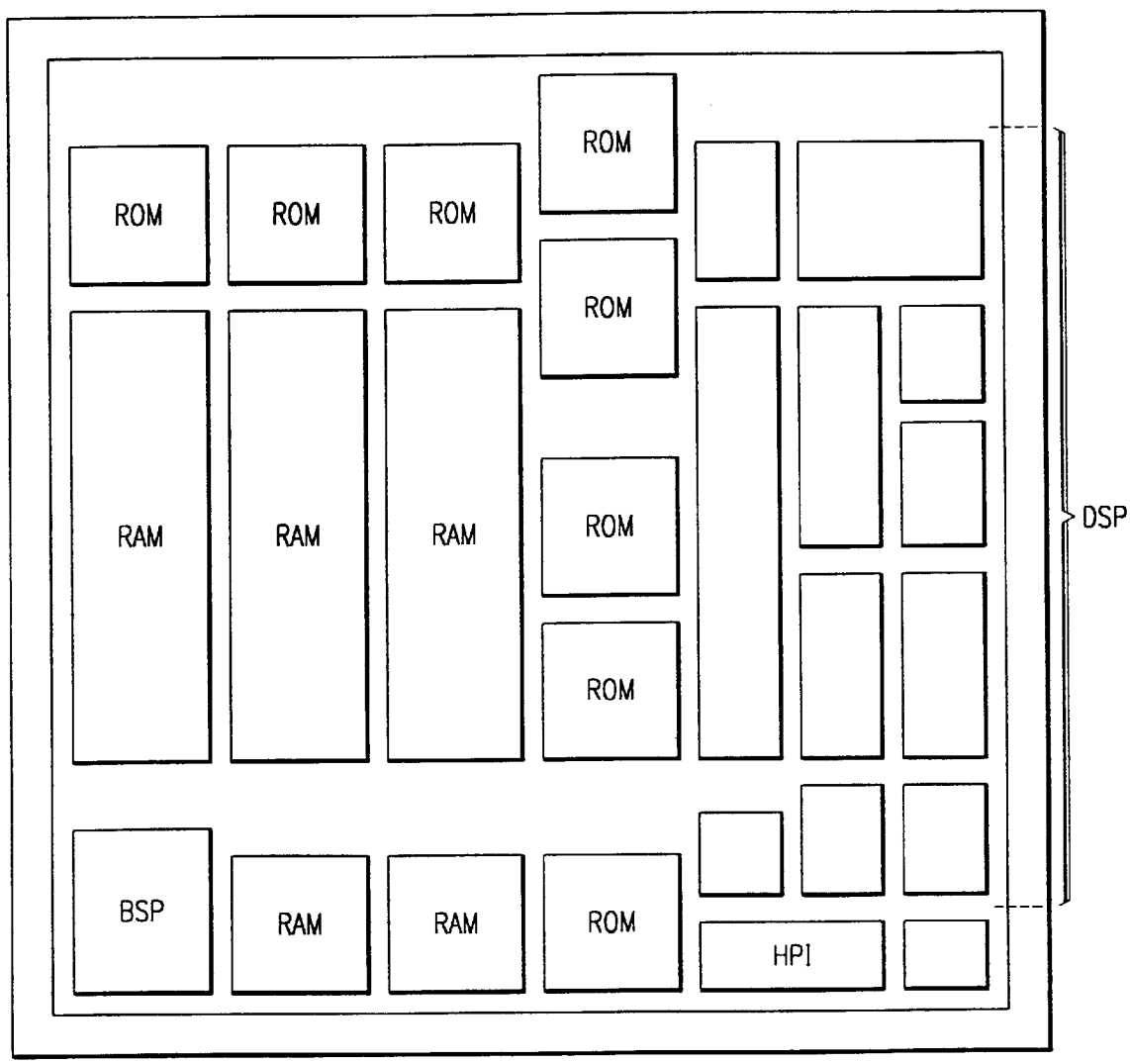
FIG. 2 depicts a diagram of bit positions in a control register used in the host port interface circuit of the present invention.
FIG. 6 depicts a top new of a CMOS/VLSI chip that includes a digital signal processor (DSP), the host port circuit of the present invention and memory associated with the DSP.

Referring now to FIG. 2 there may be seen a block diagram of the bit positions and associated signals of a control register used in FIG. 1. More particularly, there may be seen the presently preferred arrangement of control bits in control register 150 for control of certain aspects of circuit 100. As may be seen from FIG. 2, the individual bit position is numerically identified and is also identified by an item number, each bit position has its signal name below the bit position number.

The zeroth 250 and eighth 255 bit position is the byte order bit (BOB) for the BOB signal. When BOB is a one, or a logic high, the first byte corresponds to the least significant byte and the second byte corresponds to the most significant byte. When BOB is zero, or a logic low, the first byte corresponds to the most significant byte and the second byte corresponds to the least significant byte. The BOB signal affects both data and address transfers. Only the host 400 may set or modify this bit.

Further, this bit must be initialized before the first data or address register access by the host 400. That is, the BOB bit in control register 150 is used by control logic 130 to determine whether the first byte to or from host 400 goes to or is from data latch 112 or data latch 114, when the data latches are accessed, or whether the first byte to or from host 400 goes to or is from address register 122 or address register 124, when the address registers are accessed; this allows for using circuit 100 with a host 400 using data in either big endian or little endian format.

A complete host 400 access cycle involves two bytes, a first byte with HBIL low and a second byte with HBIL high. This two byte sequence is preferably followed regardless of the type of host access (e.g. address registers, control register, or data access). Before accessing data, the host 400 initializes the BOB bit and then the address registers 122, 124 (in this order since the BOB bit affects the address registers). To set the BOB bit, the host processor 400 writes to the control register 150. The host 400 then writes to the address registers 122, 124. After completion of this address write, the memory 200 is read and its contents at the given address is transferred to the two, eight bit data latches 112, 114, with the "first" byte in data latch 112 and the "second" byte in data latch 114.

During a read access to the circuit 100 and in response to control signals from control logic 130, the contents of the first byte in data latch 112 will appear on the bus 110 output pins (HD) when HBIL is low and the contents of the second byte in data latch 114 will appear on the HD pins when HBIL is high. However, if the BOB bit is reset to its other value, this sequence is reversed Clearly, the sequence of the data in latches 112, 114 and/or their sequence of reading may be reversed and still be within the scope of the present invention. Then, in response to control signals from control logic 130, the address is incremented if the autoincrement feature is enabled and the data at the incremented memory address is pre-fetched and read into the data latches 112, 114, where it is a already available for the next read.

During a write access to the circuit 100, the prefetched byte in data latch 112 is overwritten by the data coming from the host 400, in response to control signals from control logic 130, while the HBIL pin is low and the prefetched byte in data latch 114 is overwritten by the data coming from the host 400, in response to control signals from control logic 130, while the HBIL pin is high. At the end of this write access, the data in both data latches 112, 114 is transferred to the memory 200 at the address specified by the address registers 122, 124; the address is incremented prior to the memory write when the auto-increment feature is enabled.

For a host 400 read of the circuit 100, the data that appears at the HD pins was read from memory 200 during the previous host data read or address registers 122, 124 write. This has no impact when downloading or uploading program or in sequential host data reads (auto increment mode). However, for random data transfers, the processor 300 may have changed the memory word during the time between a host read and the previous host data read (or write) or address registers access. To avoid this, two reads from the same address or an address write prior to the read access may be used to ensure that the most "recent" data is read.

Continuing to refer to FIG. 2, the first 251 and ninth 256 bit position is the bit for the set mode (SMODE) signal. Normally SMODE is a zero or logic low during reset and SMODE is a one or logic high after reset. Only the processor 300 may set or modify this bit. However, both the processor 300 and host 400 may read this bit. When SMODE is a one or logic high then the circuit 100 is in the share access mode and the memory block 200 may be accessed by the processor 300 and the host 400, via circuit 100. When SMODE is a zero or logic low, then the circuit 100 is in the host only mode and the processor 300 is blocked from access to the entire memory block 200.

The host only mode (HOM) allows the host 400 to access the memory 200, via circuit 100, even while the processor 300 is in an idle or sleep mode, e.g. when all processor 300 clocks, including any external clock, are stopped. This is the optimum power consumption configuration for the processor 300. Random accesses may still be made to memory 200 by the host 400 without having to restart the equal clock (typically a PLL) and wait for its lock up time. The external clock only needs to be restarted, if at all, before taking the processor 300 out of its sleep mode.

The microprocessor 300 needs to change the mode of operation to HOM before entering such a sleep mode, so that the host may access the circuit 100 and memory 200 while the processor 300 is in such a sleep mode. When circuit 100 is in the HOM mode, the processor 300 may access the control register 150 (to change the SMODE bit or send an interrupt to the host) but not memory 200. A processor 300 access to memory 200 while circuit 100 is in the HOM mode will be blocked. The processor 300 should change the circuit's mode to shared access after exiting a sleep mode in order to gain access to memory 200.

The processor 300 changes the mode by writing a one (shared) or zero (host only) to the SMODE bit in control register 150. The processor 300 instruction following a change to the host only mode should be a no operation (NOP), for the presently preferred DSP, and the instruction following a change to the shared mode should not read memory 200, for the presently preferred DSP.

For the host 400, there are no specific restraints associated with such mode changes. For example, a third device may wake up the processor 300 and the processor 300 change modes to shared upon wakeup without a software handshake with the host 400. The host 400 may continue accessing during any mode changes. However, if the host 400 accesses the memory 200 while the mode is being changed, the actual mode change may be delayed until the access is completed; for this case, any processor 300 access to memory 200 would also be delayed until the host 400 access is completed and the mode has changed. The host 400 may use the host only mode to achieve higher access rates even though the processor 300 is not in a sleep mode.

Continuing to refer to FIG. 2, the second 252 and tenth 257 bit position is the bit for the processor interrupt (DSPINT signal. The DSPINT signal is employed when the host processor 400 interrupts processor 300.

A processor 300 interrupt is generated when the host 400 writes a one to the DSPINT bit in control register 150. This interrupt may be used to wake up the processor 300 from a sleep or idle mode. The host 400 and processor 300 preferably read this bit as a zero. A processor 300 write has no effect on this bit. Preferably, the host 400 writes a zero to the DSPINT bit while writing to the BOB or HINT bit so that it does not cause an unwanted processor interrupt.

For the preferred TMS320C5x DSPs, the host 400 may instruct the DSP 300 to execute a wide number of preprogrammed functions by simply writing the start address of a function at the address which corresponds to the address called by the DSPINT interrupt when it begins servicing the interrupt.

The third 253 and eleventh 258 bit position is the bit for the host interrupt (HINT) signal. The HINT signal is employed when the processor 300 interrupts host processor 400. This bit is normally a zero or logic low upon reset. The processor 300 may write a one causing the HINT pin to go low. The host 400 may acknowledge the interrupt by writing a one to this bit causing the HINT pin to go high.

When the processor 300 writes a one to the HINT bit, the HINT output is driven low and the HINT bit is read as a one by the processor 300 or the host 400. The HINT signal is used to interrupt the host 400. The host 400 after detecting the HINT line may acknowledge and clear the processor 300 interrupt and the HINT bit by writing a one to the HINT bit. The HINT bit will then be read as a zero by both the processor 300 and host 400. The HINT pin will then be driven high by control logic 130. If the processor 300 or host 400 writes a zero, the HINT bit remains unchanged. While accessing the SMODE bit, the processor 300 should not write a one to the HINT bit unless it also wants an interrupt of the host 400.

If the host 400 has an interrupt latch that latches any interrupt signal, then it is not necessary that host 400 dear and acknowledge the interrupt and the processor 300 may ignore any subsequent actions following the generation of the interrupt signal.

Continuing to refer to FIG. 2, bit positions four through seven 254 and twelve through fifteen 259 are reserved and are unknown on a read by the host 400 or the processor 300. These additional bit positions are employed to have control register 150 be a sixteen bit register. However, other number of bit positions may be so employed and still be within the scope of the present invention.

The processor 300 reads bit positions zero 250 through three 253, but writes to only bit positions one 251 and three 253. When processor 300 is a preferred TMS320C5x DSP, the control register 150 is preferably a memory-mapped register and the DSP accesses it as it would a block of memory; the TMS320C5x preferably addresses the control register 150 at 0500$h$ in data memory. Clearly, other memory locations, such as program memory, may be so employed. Preferably, the processor 300 should not write ones to bit positions four through fifteen.

The host 400 accesses the control register 150 with the appropriate selection of HCNTL0 and HCNTL1 and two consecutive byte accesses to the eight bit data bus 110, since the control register 150 is a sixteen bit register. For a host write, both bytes written to control register 150 must be identical. The host 400 must not write ones to the reserved bits four to seven 254 and twelve to fifteen 259. Since the processor 300 may write to the SMODE and HINT bits, the first and second byte reads of control register 150 by the host 400 may be different if the processor 300 changes the SMODE bit or the HINT bit between accesses.

Tuning now to a brief discussion of the operations of circuit 100, a preferably eight bit data bus 402 and eight bit address bus 404, HD[7:0], allows for exchanges of information with the host 400. Because of its preferred sixteen bit structure, the processor 300 (and circuit 100) expects all data transfers to and from host 400 to consist of two consecutive bytes. A dedicated control pin for circuit 100 provides the control signal, HBIL, that indicates whether the first or second byte is being transferred. Two control pins for circuit 100 provide the two control signals, HCNTL1 and HCNTL0, that indicate the type of host access to circuit 100; that is, the host 400 may access the address registers 122, 124, data (with an optional automatic address increment) in memory 200 (via data latches 112, 114), or the control register 150 depending upon the values of these two signals.

The host 400 may interrupt the processor 300 by writing to the control register 150. The processor 300 may interrupt the host 400 using a dedicated host interrupt pin, for interrupt signal HINT, that the host 400 may acknowledge and clear. Again, if the host 400 has an interrupt latch that latches any interrupt signal, then it is not necessary that host 400 dear and acknowledge the interrupt and the processor 300 may ignore any subsequent actions following the generation of the interrupt signal.

The circuit 100 uses the two data strobes, HDS1 and HDS2, the read/write strobe, HR/W, and the address strobe, HAS, to enable a "glueless" interface to a maximum variety of industry-standard host processor devices. The BOB bit is an additional way to allow for more flexibility in interfacing with a wider variety of such industry-standard host processor devices. Circuit 100 is easily interfaced to standard hosts 400 with a multiplexed address/data bus or a separate address and data buses, or with one data strobe and a read/write strobe, or two separate strobes, e.g. one for read and one for write.

More particularly, the HDS1, HDS2, and HAS signals may be used in a variety of ways to allow for glueless interfacing with a variety of host processors. If HCS is high, the host port circuit is disabled and switching HDS1/HDS2 has no effect. This is useful for hosts that send HDS strobes to multiple devices and use address decoding to generate different HCS strobes for each device. If the host has a single data strobe output, this output may be connected to HDS1 and HDS2 may be tied to VDD. If the host has separate read and write strobes, they may be connected as read to HDS1 and write to HDS2. If the host has an inverted data strobe, this strobe may connected to HDS1 and HDS2 is tied to ground.

The HAS signal is used for hosts with multiplexed address and data buses; these hosts usually have a separate address strobe which may be connected to HAS, in order to latch the HBIL, HCNTL1/2, and HRW signals independent of HCS. Since the HAS signal falls before the internally generated clock signal (csds), described later herein, for latching these four signals, these four signals will be latched and can be released before the host port begins driving any any data onto the data bus when the internal clock signal csds goes low and avoid conflicts on the multiplexed address/data bus. For hosts with separate address 404/data 402 buses, the HAS signal may be tied high and the four signals will be latched on the falling edge of the internally generated clock signal csds.

The circuit 100 has two modes of operation, a shared access mode (SAM) and host only mode (HOM). The shared access mode is the normal mode of operation and both the processor 300 and the host 400 (via circuit 100) may access memory 200 in this mode. In this shared access mode, asynchronous host 400 accesses are reynchronised internally (using synchronizer logic 130$c$) with a clock signal from processor 300 and, in case of a conflict, the host 400 has access priority and the processor 300 waits one cycle.

The host only mode allows the host 400 to access memory 200 (via circuit 100) without processor 300 being able to access memory 200. In the host only mode, the host 400 may access memory 200 even when the processor 300 is in an idle or sleep condition with all internal clocks stopped, or in a reset mode; the eternal clock, if any, for the processor 300 may even be stopped. The host 400 can therefore still access the memory 200 while the processor 300 is in its optimum configuration in terms of power consumption. Further, the mode may be changed by the processor 300 (SAM to HOM or HOM to SAM) even while a host access is occurring without disrupting that host access.

The circuit 100 also supports high speed back to back host accesses. In the shared access mode, circuit 100 can handle one byte every five periods of processor 300, e.g. 64 MP/s with a 40 Mhz processor 300. The circuit 100 allows the host 400 to take advantage of this high bandwidth and run at frequencies up to $(F*n)/5$, where n is the number of host cycles for an external access and F is the frequency of processor 300. With a 40 Mhz processor 300, and common values of 4 (or 3) for n, the host 400 can run up to 32 (or 24) Mhz without inserting wait states.

In the host only mode, the circuit 100 allows for even higher speed back to back host accesses, e.g. 1 byte every 50 ns or 160 Mb/s, independent of the clock rate of processor 300. That is, the processor 300 may shift circuit 100 to the host only mode to provide higher bandwidth for the host 400; further, in the host only mode, the circuit 100 may provide for host 400 accesses at a rate higher than the clock rate of the processor 300.

Circuit 100 includes a dedicated output control pin for a control signal, HRDY, that is provided to allow insertion of wait states for hosts that support an asynchronous input. This may be useful when the operating frequency of processor 300 is variable, or when the host 400 is capable of accessing at a faster rate than the maximum shared access mode access rate (up to the host only mode maximum access rate). In both cases, the HRDY signal provides a convenient way to automatically (no software handshake needed) adjust the host access rate for a change in processor clock rate or a switch in the mode of circuit 100.

The output signal HRDY falls after each (first and second) byte of a host access to the circuit 100 when in the shared access mode. HRDY also falls on active writes to DSPINT (host 400 sends interrupt to processor 300) or HINT (host 400 clears a previous processor 300 interrupt). The circuit 100 drives the HRDY signal high when internal processing of an access or data is completed. If the host 400 accesses the circuit 100 while HRDY is low (e.g. the host 400 is faster than the processor 300 or the processor 300 runs slowly), the host should extend the access until HRDY goes high.

Referring now to FIGS. 3a et seq there may be seen a simplified set of representative control signals and their associated timings for host 400 accesses. More particularly, in FIG. 3a it may be seen that HCS goes low to select the circuit 100. The two HCNTL signals (HCNTL1 and HCNTL2) are both active during this same time to select the desired operation, as described earlier herein, and they are depicted on a single line in FIG. 3b as an envelope having various possible high and low values. In FIG. 3c, HBIL goes low with the three other initial signals (FIGS. 3a and 3b) to indicate that the first byte of data is to be written (or read). In FIG. 3d HAS goes low after the initial group of signals have time to setup. In FIG. 3e, after HAS goes low and has time to set up, then HDS (HDS1 or HDS2) goes low.

HDS (HDS1 or HDS2) goes low to indicate the presence of the first byte of data (indicated by the one in parenthesis) to be written (or read). After HDS in FIG. 3e goes high to indicate the end of the first byte, HBIL then goes high to signal that the next byte will be the second byte. After HBIL is high, HDS in FIG. 3e again goes low to indicate the presence of the second byte of data (indicated by the two in parenthesis) to be written (or read).

FIG. 3d depicts the HAS (host address strobe) signal; the dotted line in FIG. 3d depicts an alternative value of HAS. That is, HAS may remain high or be tied high (to Vdd). However, when HAS falls, then signals HBIL, HCNTL1, HCNTL2, and HR/W are latched internally by circuit 100 on the falling edge of HAS; when HAS remains high, then these same signals are latched internally on 1the failing edge of HDS.

FIG. 3f depicts the internally generated FLAG signal; the FLAG signal is generated by the rising edge of the HDS signal. For the SAM mode the memory accesses must be done synchronously with the processor clocks to allow the memory interface logic to manage conflicts. To provide for this the FLAG signal is used in a chain of synchronizers to produce the desired memory request signals and to provide the HRDY signal; the details of these signals and synchronizer chain are discussed more fully later herein.

Figure 3:
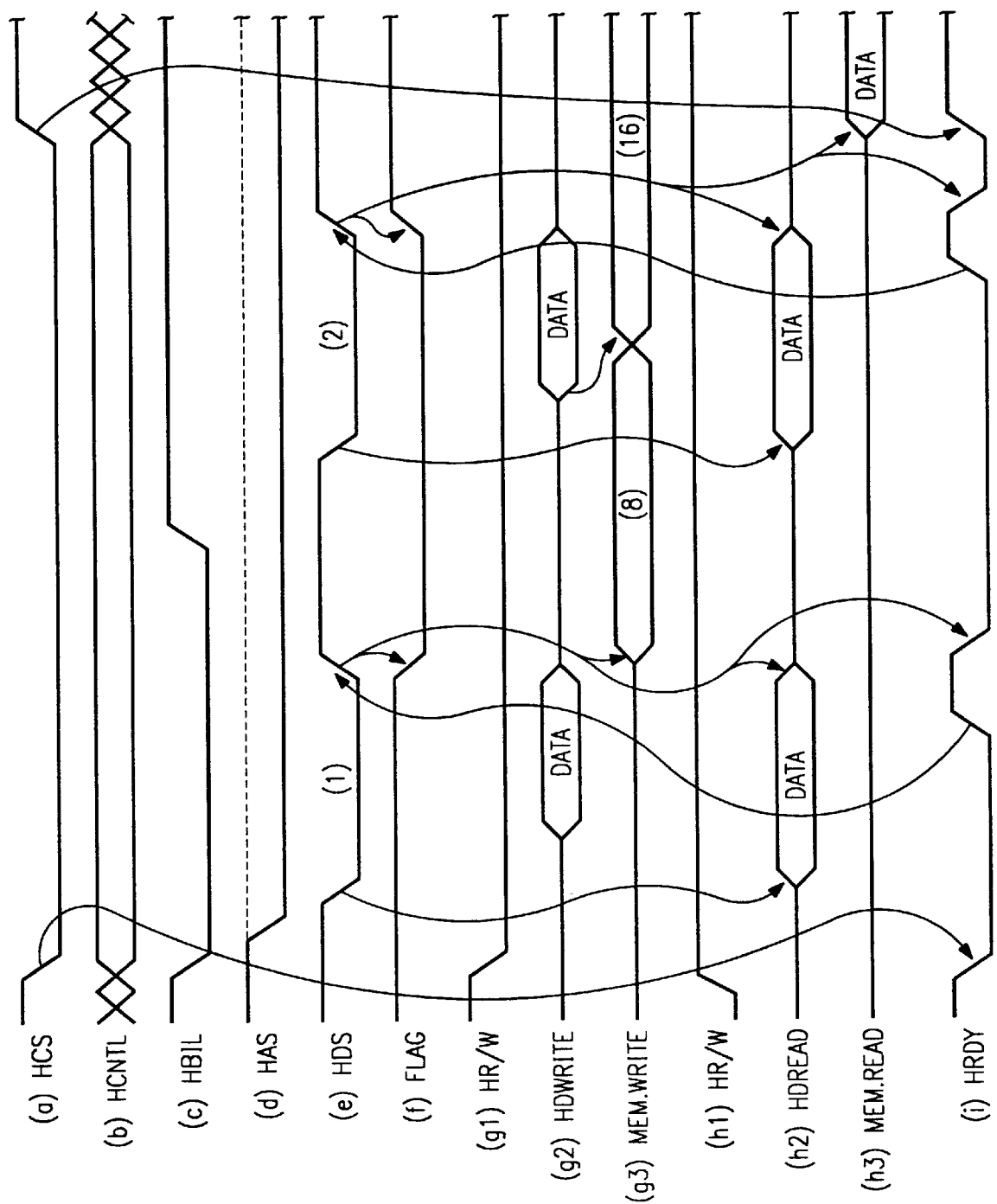
FIGS. 3a et seq. depict a simplified set of representative host processor control signals and host port interface circuit actions and their associated timings.

FIGS. 3g1–3g3 illustrate a group of control signals for a host write while FIGS. 3h1–3h3 are the same signals for a host read; both sets of Figures correspond to the timings of FIGS. 3a–3e.

FIG. 3g1 depicts the generation of the read/write signal by host 400; this signal is generated with a falling edge (for a write) that is coincident with the falling edge of the initial group of control signals of FIGS. 3a–3c, so it is an active logic low or "zero" signal. FIG. 3g2 depicts the two data bytes associated with file two HDS low portions and when they should be present on the host data bus HD. FIG. 3g3 depicts the availability of the first byte of data (indicated by the eight in parenthesis) at memory 200 and the subsequent availability of both bytes of data (indicated by the sixteen in parenthesis) at memory 200; at some time after the availability of both bytes of data (the data has had sufficient setup time) the data is written into memory 200 by an appropriate control signal (not depicted) generated by control logic 130.

FIG. 3h1 depicts the read/write signal generated by host 400, which is a logic high or "one" signal for a read. FIG. 3h2 depicts the two data bytes associated with the two HDS low portions and when the data bytes should be present on the host data bus HD. FIG. 3h3 depicts the post increment address read of data from memory 200 and its availability for the two data latches 112, 114 where it is latched by an appropriate control signal (not depicted) generated by control logic 130.

Although the memory read signal in FIG. 3h3 depicts when data is read out of memory 200, it should again be noted that data is prefetched from memory 200 and loaded in data latches 112, 114 based upon the address in the address registers 122, 124, so that the data read out as the HD read signal of FIG. 3h2 is the previously prefetched data stored in latches 112, 114.

The HRDY signal in FIG. 3i is for shared mode accesses and depicts the "falling" after each byte behavior described earlier herein. As may be seen from FIG. 3, the HCS failing edge may be used to generate the initial falling edge of HRDY, after which internal logic is used to return HRDY to a high level; that is, the internal logic 130 prevents HRDY from rising until the access is completed or data has been appropriately processed by circuit 100. The rising edge of the data strobe, HDS, may be used to generate a falling edge of HRDY as well as other appropriate signals to read or write data from memory 200. Similarly, the writing of the second byte into a data latch may be used to generate the appropriate write signals by control logic 130 to memory 200.

The arrows between the various signal lines in FIG. 3 generally indicate that the edge of one signal is used by control logic 130 to generate the indicated edge of the identified signal; for FIG. 3i, the arrow from HRDY going high to HDS going high is based upon the host sensing HRDY high and then clearing HDS high. Although the foregoing description of FIG. 3 has been directed to data and its movement into or out of memory 200 and/or data latches 112, 114, this data may also be read or written to the address registers 122, 124, or to control register 150, in a similar manner.

Figure 4:
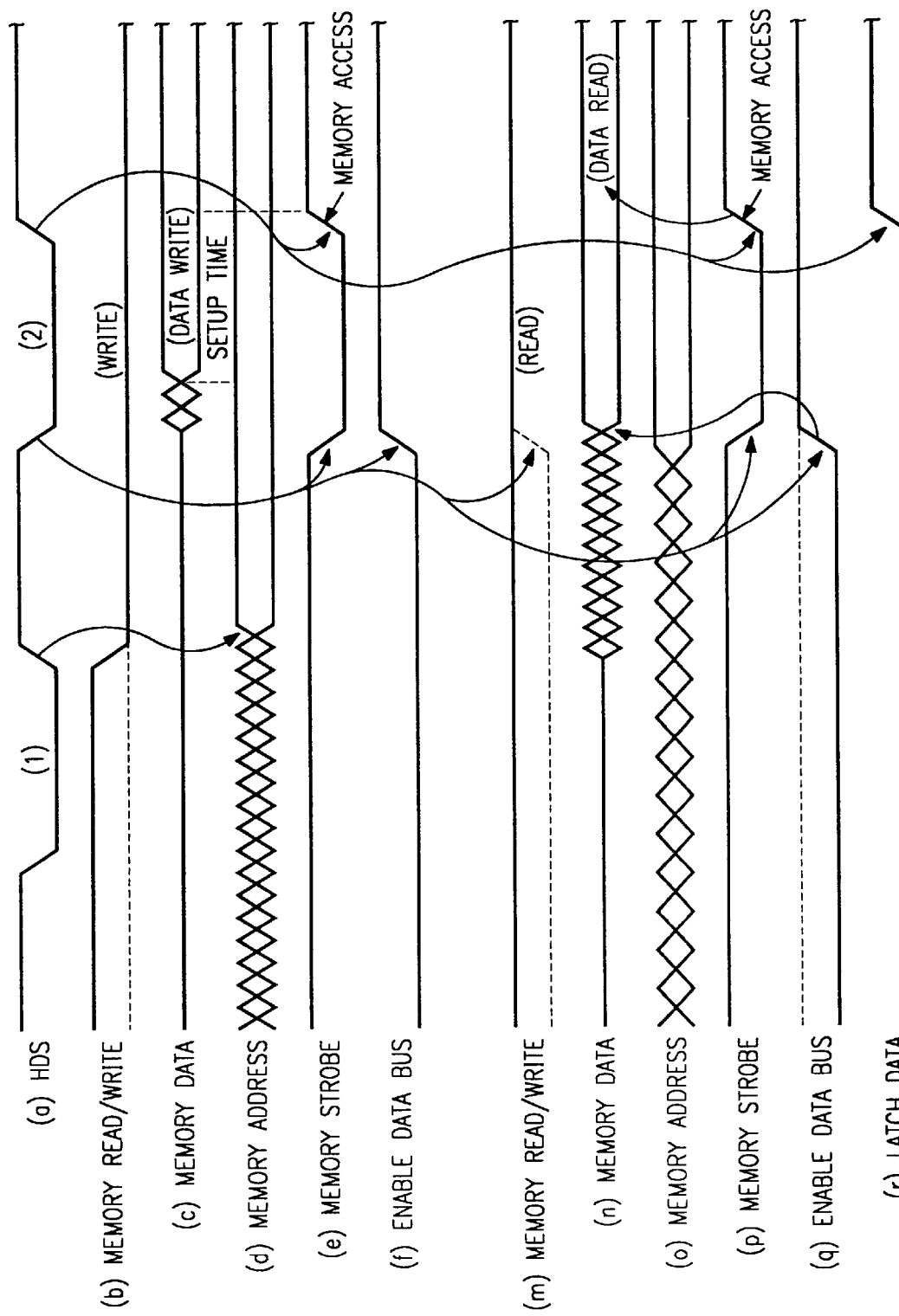
FIGS. 4a et seq. depict a simplified set of representative internal control signals and their associated timings.

Referring now to FIGS. 4a et seq there may be seen a simplified set of representative control signals and their associated timings for host 400 accesses during the host only mode of operation. More particularly, it may be seen that FIG. 4 include HDS from FIG. 3, but add new internally generated signals to illustrate how control logic 130 generates appropriate internal control signals for circuit 100. In FIG. 4a it may be seen that HDS goes low to indicate that the first byte of data to be written/read (indicated by the one in parenthesis) is available. After HDS in FIG. 4a goes high to indicate the end of the first byte, HBIL (not depicted in FIG. 4) then goes high to signal that the next byte will be the second byte. HDS again goes low in FIG. 4a to indicate the presence of the second byte of data (indicated by the two in parenthesis) to be written/read.

An internal memory read/write signal depicted in FIGS. 4b and 4m is generated to identify to memory interface 140 and memory 200 whether an access will be a read or a write operation based upon host signals HCNTL1, HCNTL2, and HB/W. FIGS. 4b–4f illustrate a group of internal signals employed for a write operation in the host only mode, while FIGS. 4m–4r illustrate the same internal signals for a read operation in the host only mode. All the internal signals 4b–4r are asynchronous signals.

Turning initially to the write operation, it may be seen from FIG. 4b that the internal write signal is preferably generated based upon the rising edge of HDS for the first byte of data and the appropriate host 400 HR/W signal, such as depicted in FIG. 3g1. The dashed line of FIG. 4b illustrates that alternatively this signal may be low for the entire time of interest, such as when the previous operation (or access) was a write. As noted earlier herein, the memory address depicted in FIG. 4d changes when the incrementer is enabled; as depicted in FIG. 4d, the address is preferably incremented on the rising edge of the HDS pulse for the first byte of data. Thus, the address is incremented before the data is written to memory 200; in this manner, the address is pre-incremented for a data write, as noted earlier herein.

The memory address of FIG. 4d preferably becomes valid (or active) around or upon the falling edge of the HDS signal for the second byte of data. Before it becomes valid the address value may be any value and it will be ignored, thus the "X"s prior to this time in FIG. 4d. After the data bus is enabled (FIG. 4f), the data to be written into memory 200 (depicted in FIG. 4c) requires some setup time before it may be written into the memory 200, via a memory access depicted in FIG. 4e.

The memory interface circuit 140 utilizes the rising edge of the memory strobe signal of FIG. 4e to actually write the data into memory 200. As depicted in FIG. 4 this memory strobe signal falls with the falling edge of the HDS signal for the second byte of data and rises with the rising edge of this same HDS signal. The memory interface logic 140 uses the memory strobe signal of FIGS. 4e and 4p for asynchronous memory accesses, such as those by host 400 when circuit 100 is in the host only mode of operation; however, an additional control signal (not depicted in FIG. 4) may be generated by control logic 130 and supplied to memory interface 140 where it is used to either enable or block the action of the memory strobe signal of FIG. 4e or 4p, e.g. when it is necessary to use synchronous accesses, such as when the circuit 100 is in the shared mode of operation, this control signal blocks the asynchronous memory strobe of FIGS. 4e and 4p.

The enable data bus signal of FIG. 4f is used to enable the data to move from the data latches 112, 114 (where the data from host 400 has already been latched by the logic circuit 130 in response to the HDS signals) to memory 200, via the various buses and interface circuit 140; that is, for example, output drivers 115 and 116 are enabled. After the data bus is enabled, then the data is available on the data bus from the latches and may be written as depicted in FIG. 4c. Again, the data is not actually written into memory 200 at the address (or incremented address) in the address registers 122, 124 until the memory strobe signal of FIG. 4e is received by the memory interface logic 140.

In a similar manner FIGS. 4m–4r depict these same internal signals and their relative timings for a read from memory 200 to the host 400 in the host only mode of operation. Again, FIG. 4p depicts when the memory access actually occurs. FIG. 4r depicts the control signal used to latch the data into the data latches 112, 114. Again, there is a small setup time after the memory access and latch signal are present before the data is stable enough to be read, as depicted in FIG. 4n by the "(Data Read)" being offset from the memory access edge in FIG. 4p. Again, the data becomes available (FIG. 4n) after the data bus is enabled (FIG. 4q). Further, the memory address of FIG. 4o may become available at an earlier time, such as indicated in FIG. 4d. In a similar manner, the data availability of FIG. 4n may be pushed back in time to about the rising edge of the memory access of FIG. 4p rather than the falling edge of this same signal as depicted. However, for the read operation, the address is post-incremented since the data for the current read was retrieved using the address of the previous access; that is, the address is not incremented until after the data has been read out of memory 200 during the previous access, again as described earlier herein.

That is, for a host write, host signals are used by control logic 130 to generate clock signals that latch data into the data latches 112, 114. The next host access is used by control logic 130 to generate signals to shift the data from the data latches to memory 200 and latch the new data/address into the data/address latches. For a host read, the data is prelatched (prefetched) and is in the data latches where it is shifted out to the host by asynchronous signals based on host signals.

The arrows between the various signal lines in FIG. 4 generally indicate that the edge of one signal is used by control logic 130 to generate the indicated edge of the identified signal. Although the foregoing description of FIG. 4 has been directed to data and its movement into or out of memory 200 and/or data latches 112, 114, this data may also be read or written to the address registers 122, 124, or to control register 150, in a similar manner. For example, a write to the address registers 122, 124 would look like FIG. 3g3.

Figure 5:
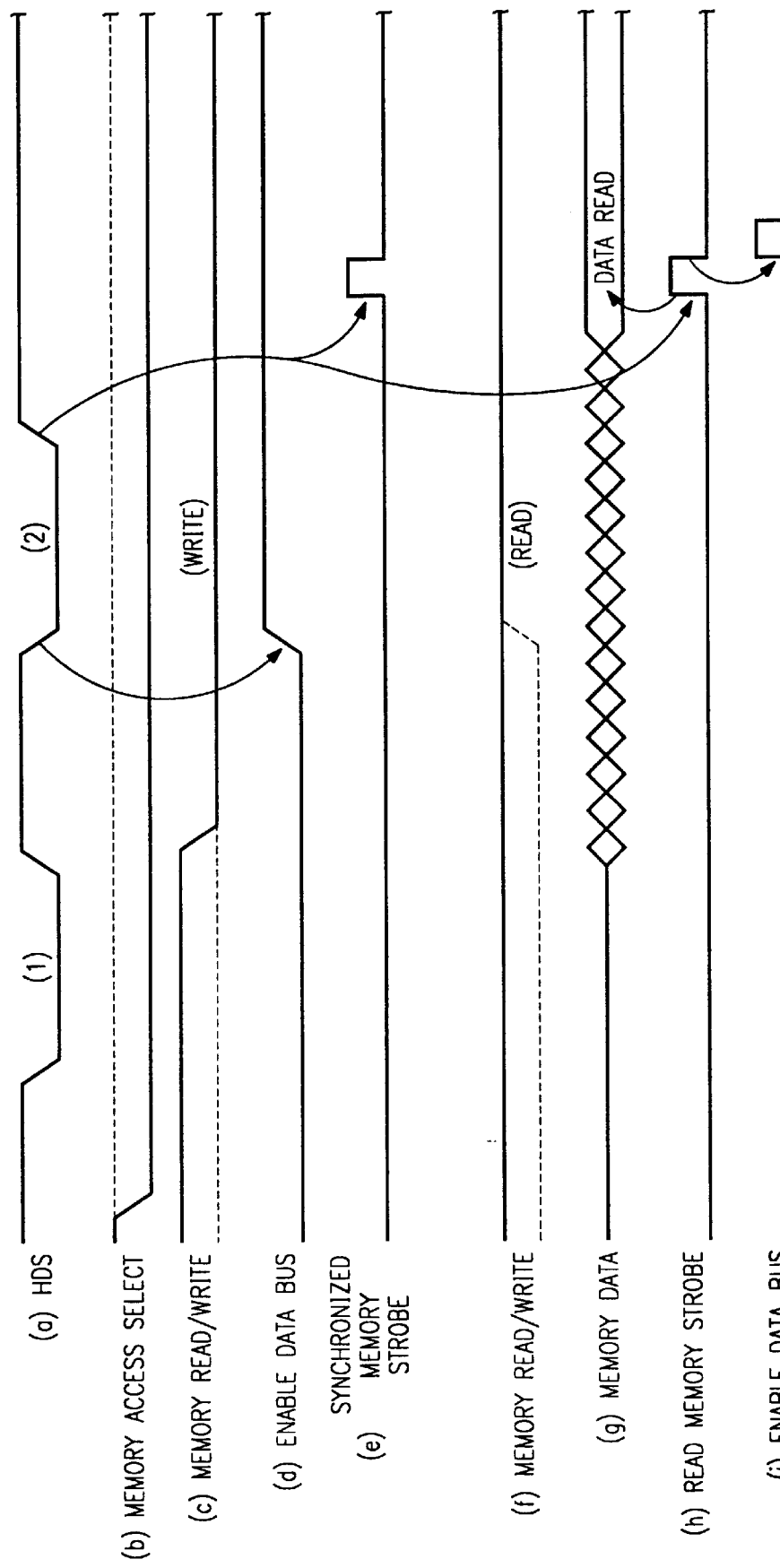
FIGS. 5a et seq. depict a simplified set of representative internal control signals and their associated timings.

Referring now to FIG. 5a et seq there may be seen a simplified set of representative control signals and their associated timings for host 400 or processor 300 accesses during the shared mode of operation. More particularly, it may be seen that FIGS. 5 include HDS from FIGS. 3 and 4 but add new internally generated signals to illustrate how the control logic 130 generates appropriate synchronous internal control signals for circuit 100 in the shared mode of operation. Further, some signals depicted in FIG. 4 remain unchanged in the shared mode and generally are not included again in FIG. 5, except when needed for clarity of discussion. For example, the memory data of FIG. 4c and memory address of FIG. 4d are unchanged for a write and are not depicted again in FIG. 5.

In FIG. 5a it may be seen that HDS goes low to indicate that the first byte of data to be written (indicated by the one in parenthesis) is available. After HDS in FIG. 5a goes high to indicate the end of the first byte, HBIL (not depicted in FIG. 5) then goes high to signal that the next byte will be the second byte. HDS again goes low in FIG. 5a to indicate the presence of the second byte of data (indicated by the two in parenthesis) to be written.

FIG. 5b depicts the earlier described control signal (referred to during discussion of FIGS. 4e and 4q) that is generated by control logic 130 and supplied to memory interface 140 to either enable or block the action of the earlier depicted (FIGS. 4e and 4p) memory strobe signal. In FIG. 5b this signal is low, which blocks the asynchronous memory strobe signal, and thus memory interface 140 may be accessed by either processor 300 or host 400, via circuit 100.

An internal memory read/write signal depicted in FIGS. 5c and 5f is generated by control logic 130 to identify to memory interface 140 and memory 200 whether an access will be a read or a write operation. The remaining FIGS. 5d–5e serve to illustrate the internal signals for a write operation in the shared mode, while FIGS. 5g–5i illustrate internal signals for a read operation in the shared mode.

Turning initially to the write operation, it may be seen from FIG. 5c that the internal write signal is generated based upon the rising edge of HDS for the first byte. The dashed line of FIG. 5c illustrates that alternatively this internal read/write signal may be low for the entire time of interest, when the previous operation was also a write. The memory address of FIG. 5 for a write is depicted in FIG. 4d and preferably becomes valid around or upon the falling edge of the HDS signal for the second byte of data. Before it becomes valid the address value may be any value and it will be ignored, thus the "x"s prior to this time in FIG. 4d. However, as noted earlier herein, when the incrementing feature is enabled, the address is preferably incremented on the rising edge of the HDS pulse for the first byte of data. After the data bus is enabled (FIG. 5d), the data to be written into memory 200 (depicted in FIG. 4c) requires some setup time before it may be written into the memory 200, via a memory access depicted in FIG. 5e.

The control logic 130 synchronises the rising edge of the second HDS pulse of FIG. 5a with the clock of processor 300 to generate a synchronised memory strobe signal depicted in FIG. 5e. The synchronised memory strobe signal of FIG. 5e is used by memory interface logic 140 to generate other signals to actually latch the address and write the data into memory 200.

Again, the memory interface logic 140 uses the memory strobe signal of FIGS. 4e and 4p for asynchronous memory accesses, such as those by host 400 when circuit 100 is in the host only mode of operation. However, a memory access select control signal depicted in FIG. 5b may be generated by control logic 130 and supplied to memory interface 140 where it is used to block the action of the memory probe signal of FIG. 4e or 4p when synchronous accesses are needed. The enable data bus signal of FIG. 5d is used to enable the data to move from the data latches 112, 114 to memory 200, via the various buses, drivers and memory interface circuit 140.

In a similar manner, FIGS. 5f–5i depict internal signals and their relative timings for a read from memory 200 to the host 400 in the shared mode of operation. FIG. 5g depicts when the prefetched memory data is available for being read into latches 112, 114; again, there is a slight delay because control logic 130 synchronises the rising edge of the HDS signal for the second byte of data to the clock of processor 300. After a memory access the data bus is enabled as depicted in FIG. 5i. FIG. 5h depicts when the memory access actually occurs. The data bus enable signal (FIG. 5i) is also used to latch the data into the data latches 112, 114.

That is, for a host write, host signals are synchronised by control logic 130 to provide synchronous signals that latch data into the data latches 112, 114 and shift the data from the data latches to memory 200. For a host read, the data is prelatched (prefetched) and is in the data latches where it is shifted out to the host by synchronous signals based on host signals.

The arrows between the various signal lines in FIG. 5 generally indicate that the edge of one signal is used by control logic 130 to generate the indicated edge of the identified signal. Although the foregoing description of FIG. 5 has been directed to data and its movement into or out of memory 200, this data may also be read or written to the address registers 122, 124, or to control register 150, in a similar manner.

The HRDY signal is provided to allow the host processor 400 the option of either (a) waiting for HRDY to "clear" (or return to preferably a logic high) or (b) adhering to tings for its signals based upon the clock cycles or timings of processor 300. The EHRY signal is preferably generated by control logic 130 during a host access when the circuit is in the shared mode of operation or when either processor writes a valid interrupt bit to control register 150. For any of these accesses, when EiDS goes high to indicate the end of an access at the end of a byte, HRDY will go low. This allows the host 400 to sample HRDY the next time HDS goes low, and if necessary, extend the next access. HRDY goes high after internal synchronization of an access is completed or the actions needed for an internal access are completed.

In more detail for a shared mode host data write the second byte access is extended until an internally generated synchronization signal goes low, to ensure that the chain of latches used for synchronization of host signals is reset to low values which ensures that an HDS rising edge may be detected. The first byte of the next host access is extended by a different internally generated control signal until an internal synchronization signal goes high; this is used to ensure that the write of data to memory 200 is completed before continuing with any other accesses.

For a shared mode host data read the second byte is again extended in the same manner as for (and for the same reasons as) the host write described above. The first byte of the next host access is again extended in the same manner as for the host write described above; this is used to ensure the data has sufficient time to propagate from the memory 200 to host 400 and that the host 400 has internally latched the data.

When the host 400 writes a logic high or a "one" to the DSP interrupt bit of control register 150 in either the shared or host only mode, the second byte will be extended by an internal control signal until an internal synchronization signal based on the interrupt bit goes high to allow for the generation of a synchronous interrupt pulse to processor 300. The first byte of the next access will be extended by another related internal control signal until the internal synchronization signal goes low this is used to allow the chain of latches used for synchronizing host control signals to dear or reset to zero so that another host 400 write to the DSP interrupt bit will be able to generate another interrupt.

Similarly, when the processor 300 writes a logic high or a "one" to the host interrupt bit of control register 150 in either the shared or host only mode, the interrupt is provided to the host 400. If the host 400 writes a "one" to clear the interrupt, the second byte will be extended by an internal control signal until an internal synchronization signal based on the interrupt bit goes high to allow for the generation of a synchronous interrupt pulse to host 400. The first byte of the next access will be extended by another related internal control signal until the internal synchronization signal goes low, this is used to allow the chain of latches used for synchronizing processor control signals to dear or reset to zero so that another processor 300 write to the host interrupt bit will be able to generate another interrupt.

As noted earlier herein, the processor 300 may modify the SMODE bit in control register 150 to shift the mode between the host only mode and the shared access mode. The transition from one mode to the other is handled by control logic 130 of the circuit 100 and is a smooth transition to ensure no lost or spurious reads or writes, especially if a host access is occurring during a mode change. That is, the processor 300 may shit between modes even while a host access is occurring and not disrupt that host access.

In shifting from the SAM mode to the HOM mode, the processor 300 preferably stops accessing memory 200 one processor clock cycle (no NOPs are required) before it resets the SMODE bit from one to zero; this prevents any memory access conflicts between host 400 and processor 300 during the mode change. When the SMODE bit is changed, an internal smod signal based upon the value of this SMODE bit stored in control register 150 is modified to reflect the bits value in the register. The internal smod signal is then used by control logic 130 to effect the mode change. The host 400 may continue to access memory 200 during such a mode change.

When shifting from the HOM mode to the SAM mode, if the mode changes close in time to a host memory access, a spurious memory access strobe may occur. To avoid this problem, the control logic 130 defines a "window" (initiated by the rising edge of the data strobe, HDS, for the second byte of data) during which the internal smod signal is not allowed to change from low to high to effect the mode change. The change in the internal smod signal is delayed by the window to avoid any such spurious memory access.

The foregoing description has generally been for a presently preferred embodiment of the present invention. However, as noted earlier herein, various modifications or alterations may be made in portions of circuit 100 and still be within the scope of the present invention. For example, the multiplexed data and address bus 110 may alternatively be an individual internal multi-bit data bus 110d connected to the input multiplexers 111, 113 and control register 150 and an appropriate number of separate data input/output pins, and an individual internal multi-bit address bus 110a connected to input multiplexers 121, 123 and an appropriate number of separate address input/output pins.

Similarly, although the host bus 402 is an eight bit wide bus and the internal bus 110 is also an eight bit wide bus, other bus widths may be so employed in the present invention; the bus width may be, for example, but not limited to, sixteen or thirty-two bits, e.g. powers of two, or ten or twelve bits, e.g. multiples of two, or integer values, such as twenty-one, or twenty-four bits, e.g. multiples of eight bits. In a similar manner, the buses 148 and 152 to and from memory interface logic 140 may each individually be more or less than the presently preferred sixteen bits.

Memory 200 and processor 300 may utilize word lengths other hn sixeen bits. For example, if a twenty-four bit word is utilized, circuit 100 may be modified by adding an additional eight bit data latch, along with supporting input and output devices, in parallel with the two data latches 112, 114, or data latches 112, 114 may each be lengthened to twelve bits. In a similar manner, the number of data latches employed may modified from that described earlier herein; as an example, an additional pair or set of data latches may be added in parallel to latches 112, 114 that serve as "read" latches, while latches 112, 114 serve as "write" latches. Further, additional pairs or sets of latches may be added to provide separate read and write latches for the shared mode and separate read and write latches for the host only mode. Alternatively, separate latches for shared mode operations and separate latches for host only mode operations may be employed in the circuit 100 of the present invention. Similarly, the number and sizes of address registers 122, 124 may be altered and still be within the scope of the present invention.

Referring now to FIG. 6, there may be seen a top view of a CMOS/VLSI chip that includes a C5x DSP, the circuit 100 and several blocks of memory associated with the DSP. More particularly, there may be seen several blocs of ROM and several blocks of singe parted RAM, one of which may serve as memory 200. In addition, there are two blocks of dual ported RAM. There may also be seen the portion of the chip that corresponds to circuit 100 (labeled HPI) and generally the remainder of the chip is the DSP. Note that the DSP depicted may include other serial or parallel ports (not identified in FIG. 6) for interfacing with other external devices. Thus, the circuit 100 may be integrated on a single chip with memory 200 and a DSP 300. FIG. 6 is one example of such an integration. Clearly, different types and sizes of memory may be present on the chip (of which a portion is used for memory 200), and different types of DSPs or processors 300 may be on the chip with circuit 100 and the memory.

Figure 7A:
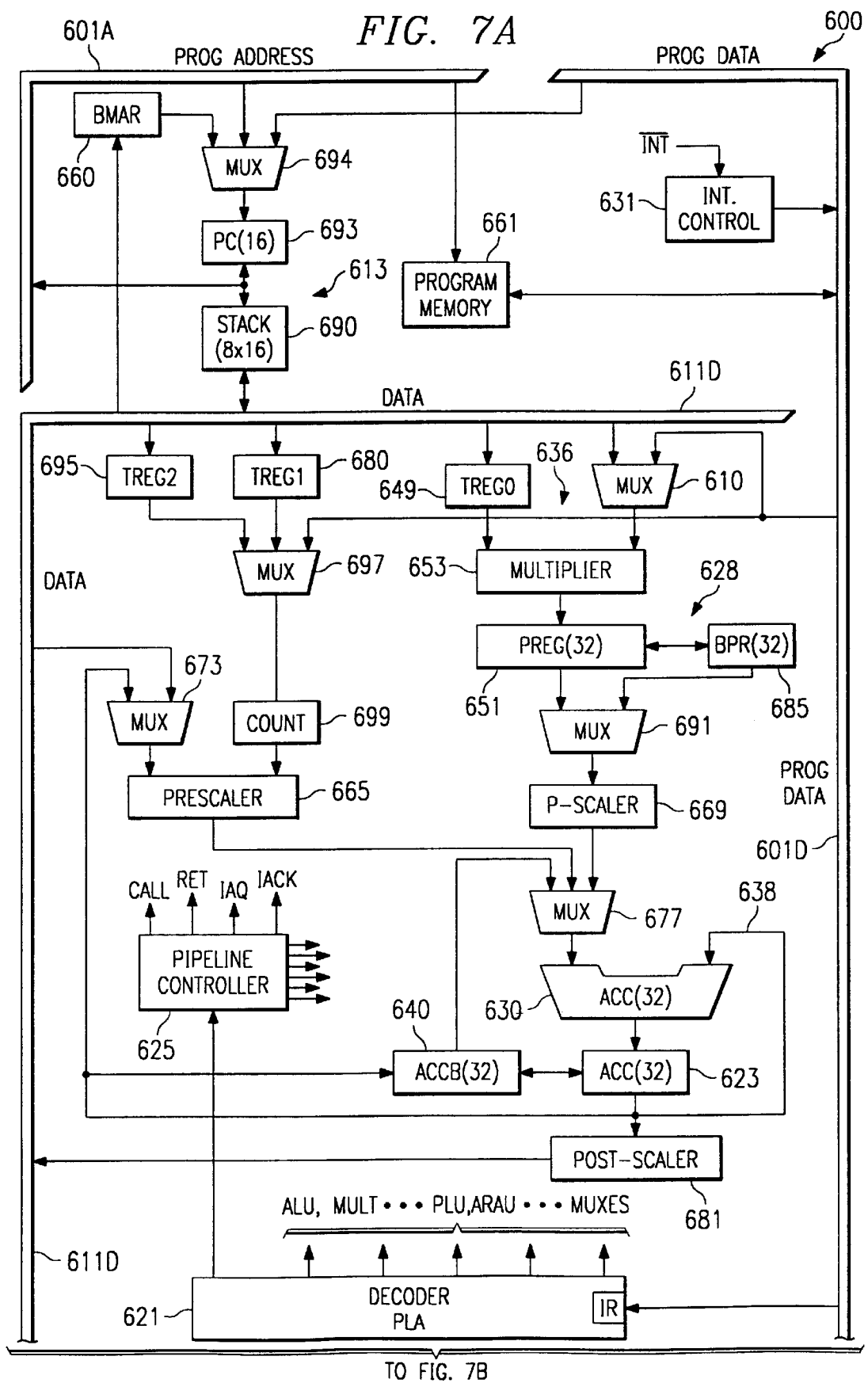
FIGS. 7A and 7B depict a simplified functional block diagram of the DSP shown in FIG. 6.
Figure 7B:
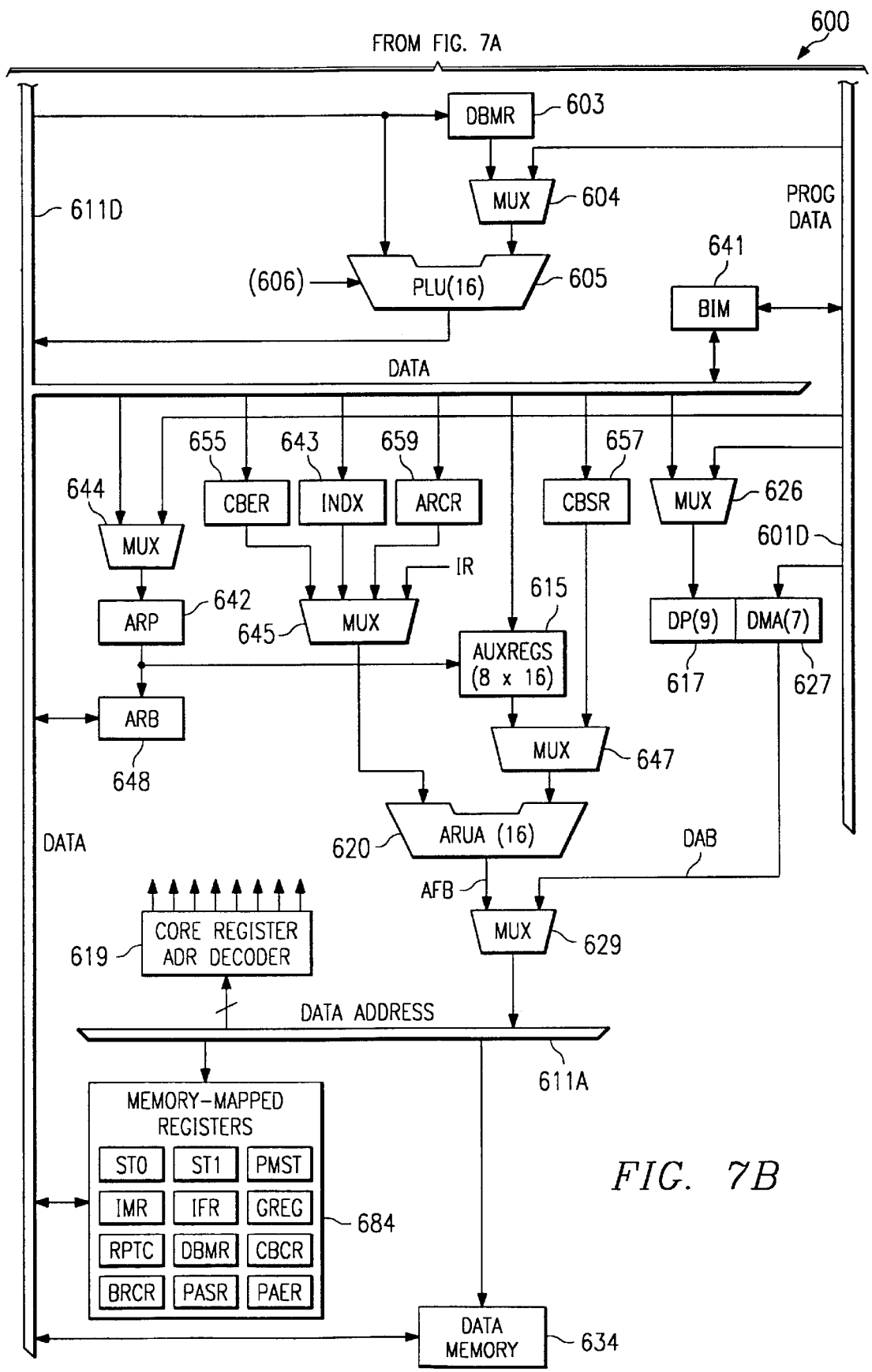

Referring now to FIGS. 7A and 7B, there may be seen a simplified functional block diagram of a presently preferred TMS320C5x DSP, which is exemplary of a DSP that may be employed with the circuit 100 of the present invention. The functional block diagram shown in FIGS. 7A and 7B depicts the principal blocks and data paths within a presently preferred TMS320C5x digital signal processor. The presently preferred DSP device 600 of FIGS. 7A and 7B implements a Harvard-type architect that employs two separate bus structures, one for program and one for data, to allow for full-speed execution that maximizes processing power. The processor 600 internal hardware includes a single-cycle 16×16-bit multiplier 636, data shifters 665, 669, 681 and address generators/manipulators 620.

Again, the C5x processor architecture is built around two major buses: a program bus, 601A and 601D, and a data bus, 611A and 611D. The program bus 601 carries instruction code and immediate operands from a program memory 661 on program data bus 601D, while addresses are supplied to program memory 661 on program address bus 601A. That is, program memory 661 is connected at its addressing inputs to program address bus 601A and at its read/write input/output to program data bus 601D.

The data bus includes a data address bus 611A and a data data bus 611D, which interconnects various elements, such as the Central Arithmetic Logic Unit (CALU) 628, an auxiliary register file 615, registers 684 and data memory 634. Data memory 634 and registers 684 are addressed via data address bus 611A. A core register address decoder 619 is connected to data address bus 611A for addressing registers 684 and other addressable CPU core registers.

Together, the program and data buses 601 and 611 can carry data from on-chip data memory 634 and internal or external program memory 661 to the multiplier 636 in a single cycle for multiply/accumulate operations.

The device 600 has a program addressing circuit 613 and a central computation circuit 628. Computation circuit 628 performs two's-complement arithmetic using a 32 bit ALU 630 and accumulator 623. The ALU 630 is a general-purpose arithmetic logic unit that operates using 16-bit words taken from data memory 634 of FIG. 7B or derived from immediate instructions or using the 32-bit result of multiplier 636. In addition to executing arithmetic instructions, the ALU 630 can perform Boolean operations. The accumulator 623 stores the output from the ALU 630 and provides a second input to the ALU 630 via a path 638. The accumulator 623 is illustratively 32 bits in length and is divided into a high-order word (bits 31 through 16) and a low-order word (bits 15 through 0). Instructions are provided for storing the high and low order accumulator words in data memory 634. For fast, temporary storage of the accumulator 623 there is a 32-bit accumulator buffer ACCB 640.

A processor scaling shifter 665 has a 16-bit input connected to data bus 611D via a multiplexer (MUX) 673, and a 32-bit output connected to the ALU 630 via a multiplexer 677. The scaling shifter 665 produces a leftshift of 0 to 16 bits on the input data, as programmed by instruction or defined in a shift count register (TREG1) 680. The LSBs (least significant bits) of the output are filled with zeros, and the MSBs (most significant bits) may be either filled with zeros or sign-extended, depending upon the state of the sign-extension mode bit SXM of the status register ST1 in the set of registers 684 of FIG. 7B. Additional shift capabilities enable the processor 600 to perform numerical scaling, bit extraction, extended arithmetic, and overflow prevention.

The multiplier 636 of FIG. 7A performs a 16×16 bit two's complement multiplication with a 32-bit result in a single instruction cycle. The multiplier consists of three elements: a temporary TREG0 register 649, product register PREG 651 and multiplier array 653. The 16-bit TREG0 register 649 temporarily stores the multiplicand; the PREG register 651 stores the 32-bit product. Multiplier values come from data memory 634, from a program memory 661 when using the MAC/MACD instructions, or are derived immediately from the MPYK (multiply immediate) instruction word. The fit on-chip multiplier 636 allows the device 600 to efficiently perform fundamental DSP operations such as convolution, correlation, and filtering.

Up to eight levels of a hardware stack 690 are provided for saving the contents of a program counter 693 during interrupts and subroutine calls. Program counter 693 is selectively loaded upon a context change via a MUX 694 from program address bus 601A or program data bus 601D. The program counter 693 is written to address bus 6101A or pushed onto stack 690. On interrupts, certain strategic registers are pushed onto a one deep stack and popped upon interrupt return; thus providing a zero-overhead, interrupt context switch. The interrupts operative to save the contents of these registers are maskable.

The program counter 693 addresses program memory 661, either on-chip or off-chip, via the program address bus 601A Through the address bus 601A, an instruction is addressed in program memory 661 and loaded via program data bus 601D into the Instruction Register (IR) for a decoder PLA 621. When the IR is loaded, the PC 693 is ready to start the next instruction fetch cycle. Decoder PLA (programmable logic array) 621 has numerous outputs for controlling the MUXes and processor elements needed to execute the instructions in the processor instruction set. For example, decoder PLA 621 feeds command signals to a pipeline controller 625 which also has various outputs for implementing the pipelined processing operations so that the processor elements are coordinated in time. The outputs of pipeline controller 625 also include CALL, RET (RETURN), IAQ (interrupt acquisition) and IACK (interrupt acknowledge).

In addition to the main ALU 630 there is a Peripheral Logic Unit (PLU) 605 in FIG. 7B that provides logic operations on memory locations without affecting the contents of the accumulator 623. The PLU 605 provides extensive bit manipulation ability for high-speed control purposes and simplifies bit setting, clearing, and testing associated with control and status register operations.

Eight auxiliary registers (AR0–AR7) in the auxiliary register file 615 may be connected to the Auxiliary Register Arithmetic Unit (ARAU) 620 shown in FIG. 7B. Although the ARAU 620 is useful for address manipulation in parallel with other operations by CALU 628, it also serves as an additional general-purpose arithmetic unit since the auxiliary register file can directly communicate with data memory. The ARAU implements 16-bit unsigned arithmetic.

In FIG. 7B, a Bus Interface Module (BIM) 641 is connected between data bus 611D and program data bus 601D. BIM 641 permits data transfer between buses 601D and 611D and increases the architectural flexibility of the processor compared to either classic Harvard or Von Neumann architecture.

In response to a powerdown instruction and when operating in a powerdown mode, the processor core enters a dormant state and dissipates considerably less power than the power normally dissipated by the device. The powerdown mode is invoked either by executing an IDLE instruction or by driving the HOLD- input low while the HM status bit is set to one.

While in powerdown mode, all of the internal contents of processor 613, 628 are maintained to allow operation to continue unaltered when the powerdown mode is terminated. Powerdown mode, when initiated by an IDLE instruction, is terminated upon receipt of an interrupt When powerdown mode is initiated via the HOLD- signal it is terminated when the HOLD- goes inactive.

The power requirements can be further lowered to the submilliamp range by slowing down or even stopping the input clock. Reset, RS-, is suitably activated before stopping the clock and held active until the clock is stabilized when restarting the system. This brings the device back to a known state. The contents of most registers and all on chip RAM remain unchanged; the exceptions include the registers modified by a device reset Referring now to FIG. 8 there may be seen a functional block diagram of a portion of the circuitry of FIG. 1 that is used for the memory logic interface 140. More particularly, it may be seen in more detail that memory 200 has a data in 810 and a data out 820 port, an address port 830 and a series of control lines 840 associated with its control port.

Figure 8:
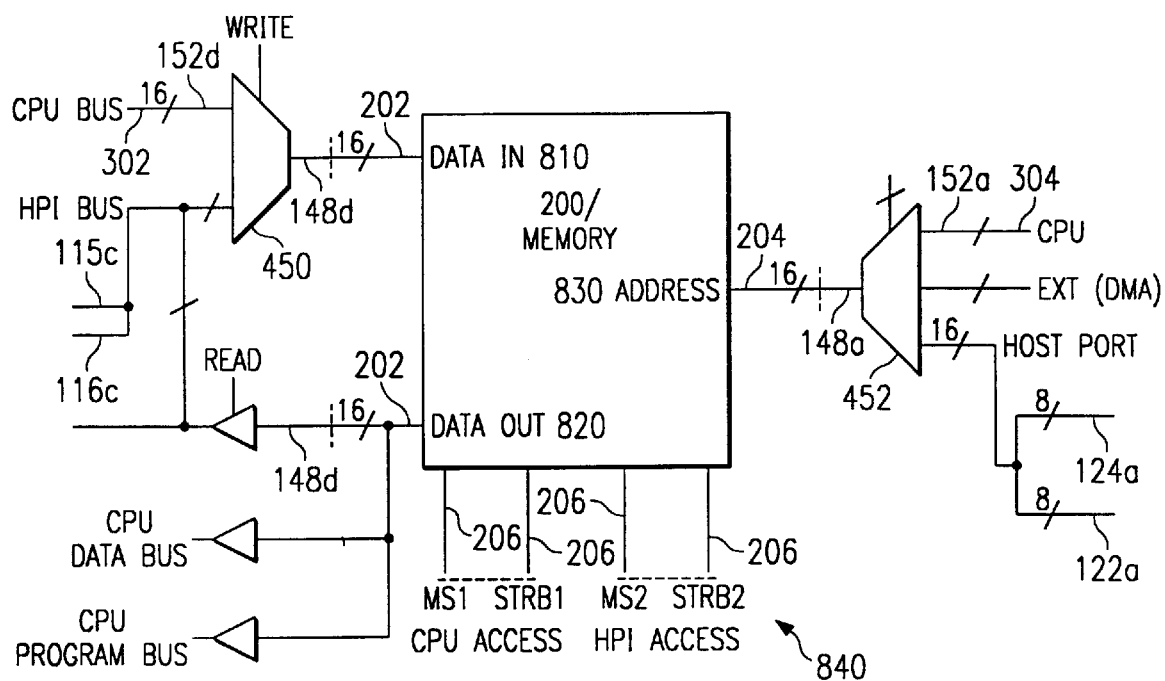
FIG. 8 depicts a schematic block diagram of a portion of the circuit employed in FIG. 1 for the memory interface.

As may be seen from FIG. 8, the data from the processor 300 (FIG. 1) on its data bus 302 is supplied to internal data bus 152d, which supplies the data as an input to multiplexer 450. The other input to multiplexer 450 is data from the circuit 100 (FIG. 1) via lines 115c, 116c, as described earlier herein. An appropriate control signal is generated by control logic 130 or memory control logic (not shown) to allow data from processor 300 or data latches 112, 114 to be provided on line 302, or lines 115c, 116c, through mux 450 to the input port (DATA IN) of memory 200.

In a similar manner, the address supplied to memory 200 on its address bus 204 is one of three selected by multiplexer 452 again based upon control signals from control logic 130 or memory control logic (not shown). One input address signal is generated by the processor 300 (FIG. 1) and is supplied on its address bus 304. A second input address signal may be generated by an external device, such as an external direct memory access (DMA) device. A third input address signal is generated by the address registers 122, 124 (FIG. 1) and supplied on lines 122a, 124a.

The data output by memory 200 on its data bus 202 may be supplied to the processor 300, to the data latches 112, 114, or to an external device.

The processor 300 and host port 100 control access to the memory 200 using the MS1 and STEB1 signals in the SAM mode; the processor 300 normally accesses memory 200 using these same signals. The MS1 signal is the control signal used to block access to memory 200 via the MS2 and STRB2 signals and the STRB1 signal is the memory strobe signal. The host port 100 accesses memory 200 using the MS2 and STRB2 signals in the HOM mode; this allows the host port 100 to access memory 200 independently of the processor 300, or its clocks, e.g. even when the processor is in a sleep or idle mode.

The processor 300 and host port 100 may both access memory 200 using the MS1 and STRB1 signals; effectively, each set of control signals corresponding to MS1 (and STRB1) from the processor 300 and host port 100 are inputs to a mux whose control signals are generated by control logic 130 or memory control logic (not shown).

In addition, a RDY signal (not depicted in FIG. 8) is supplied to the processor 300 when it may access the memory 200; that is, if the processor 300 attempts to access the memory 200 during a host port 100 access, the RDY signal will delay the processor access until the host port access is completed. Again, the host port 100 has access priority over the processor 300 and the processor waits for the host port accesses to be completed.

Figure 9:
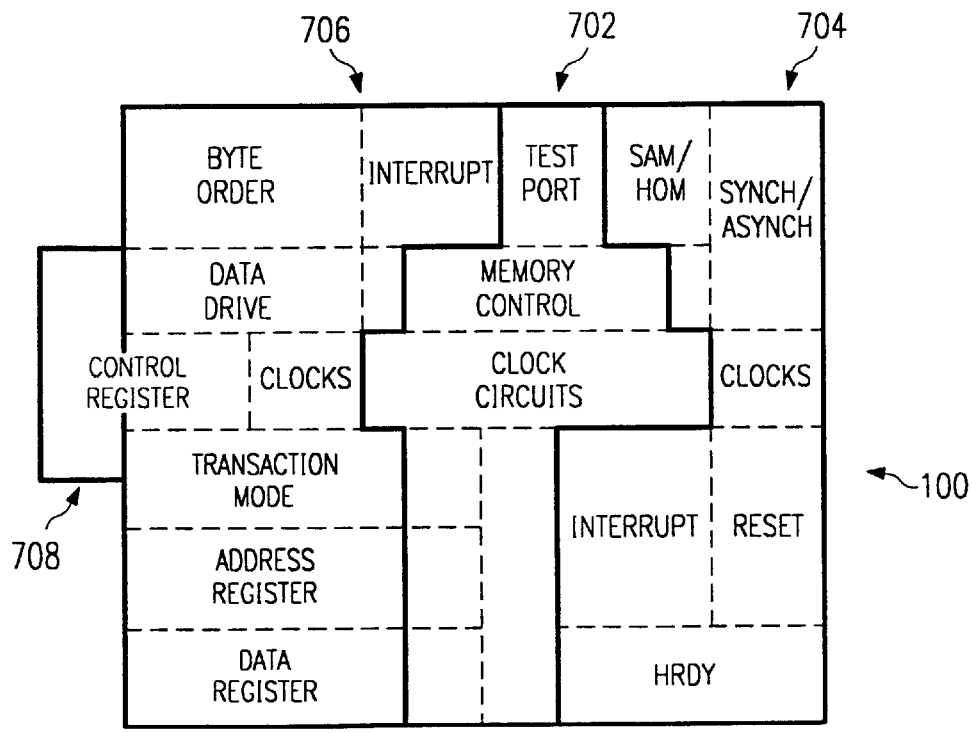
FIG. 9 depicts a high-level functional block diagram of the host port interface of the present invention.

Referring now to FIG. 9, there may be seen a high-level functional block diagram of the host port 100 described earlier herein. More particularly, it may be seen from FIG. 9 that the host port 100 consists of four major functional blocks 702–708, each outlined with a heavy black line. One of these functional blocks 702 represents circuitry for generating clock signals and includes a test port. In addition, there is also shown a functional block 704 that represents control and operational logic that operates on processor 300 supplied clock signals. Another functional block 706 represents control and operational logic, driven by clock signals based upon host processor 400 signals. Note that the total memory control function (mostly in clock block 702) is enclosed in a dashed line that includes dashed line portions in the two blocks that are driven by the processor 300 clock signals and the host-based clock signals (in addition to the dashed line portion in the clock block); thus, the "clocks" portions depicted in blocks 704, 706. Some other total functions are similarly shared by more than one of the four functional blocks. The final functional block 708 represents the control register and its associated circuitry, some of which is included in the block 706; thus, the dashed lines around the words "control register" in block 706 are intended to depict that the control register circuitry is not only found in block 708, but also in block 706 as well.

The host clock driven block 706 includes clock generation circuitry, memory control circuitry, byte order control circuitry, transaction mode circuitry, circuitry to drive data back to the host, interrupt circuitry, circuitry for controlling the address register, circuitry for controlling the data register, and circuitry for interfacing with the control register.

The processor clock driven block 704 has a portion that provides processor clock signals to the remainder of the processor clock driven block and other blocks. The processor clock driven block 704 also includes synchronizers for synchronizing some host clocked signals to the processor clock. The processor clock driven block 704 further includes circuitry for converting between the SAM and HOM modes, interrupt circuitry, reset circuitry and HRDY circuitry.

Figure 10:
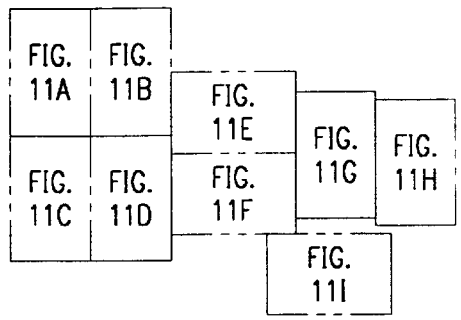
FIG. 10 depicts a block diagram illustrating how

The logic elements of the host port 100 that make up the functional blocks 702, 704, 706, and 708 described briefly in connection with FIG. 9, are shown in detail in FIGS. 11A–11J. FIG. 10 is a block diagram depicting how FIGS. 11A–11J are generally arranged to be interconnected to make up the circuitry for the host port 100.

Figure 11A:
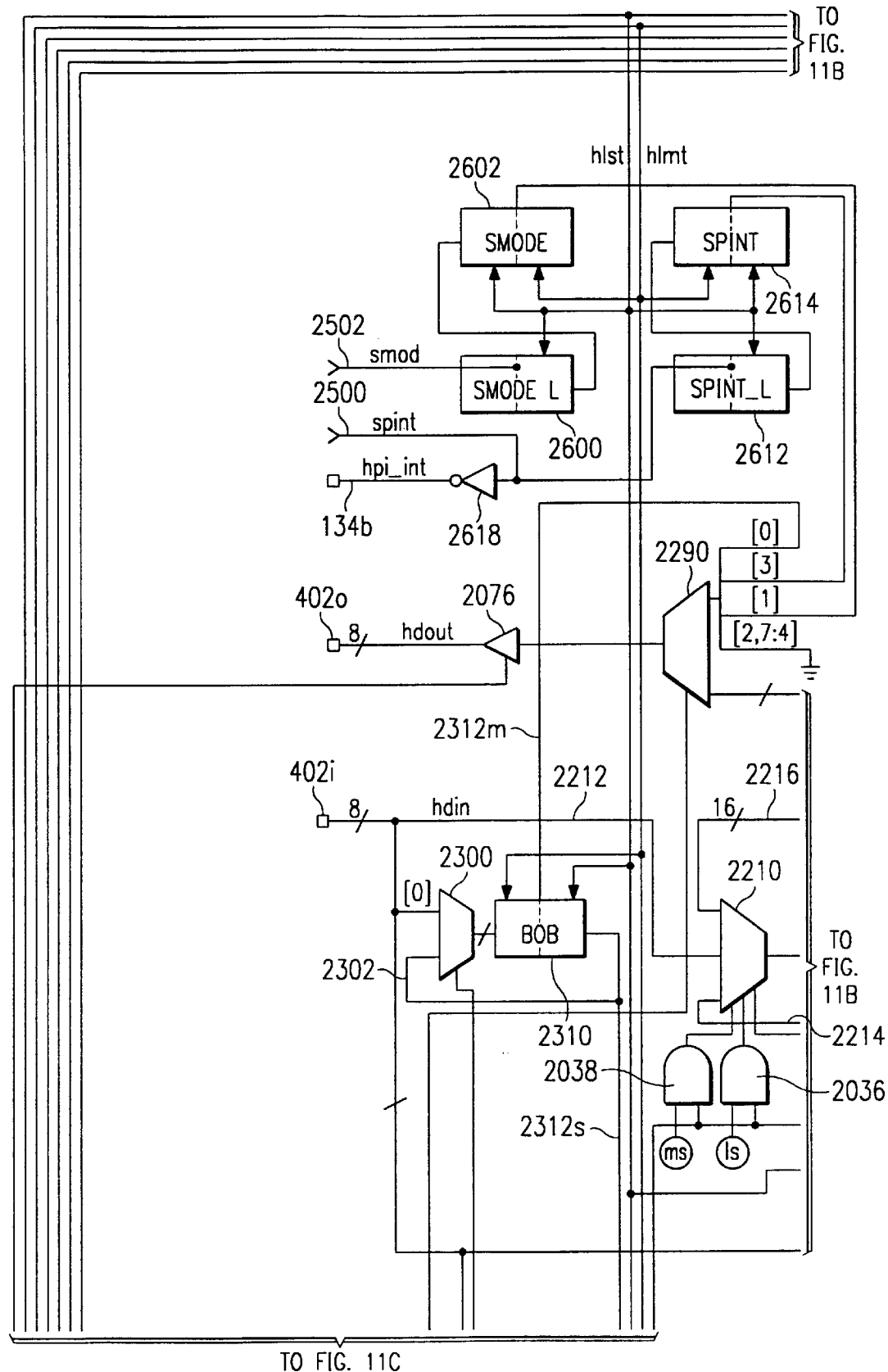
FIGS. 11A–11J are generally arranged to provide the detailed circuitry that makes up the host port circuit of the present invention arranged in the blocks corresponding to those of FIG. 9.
Figure 11B:
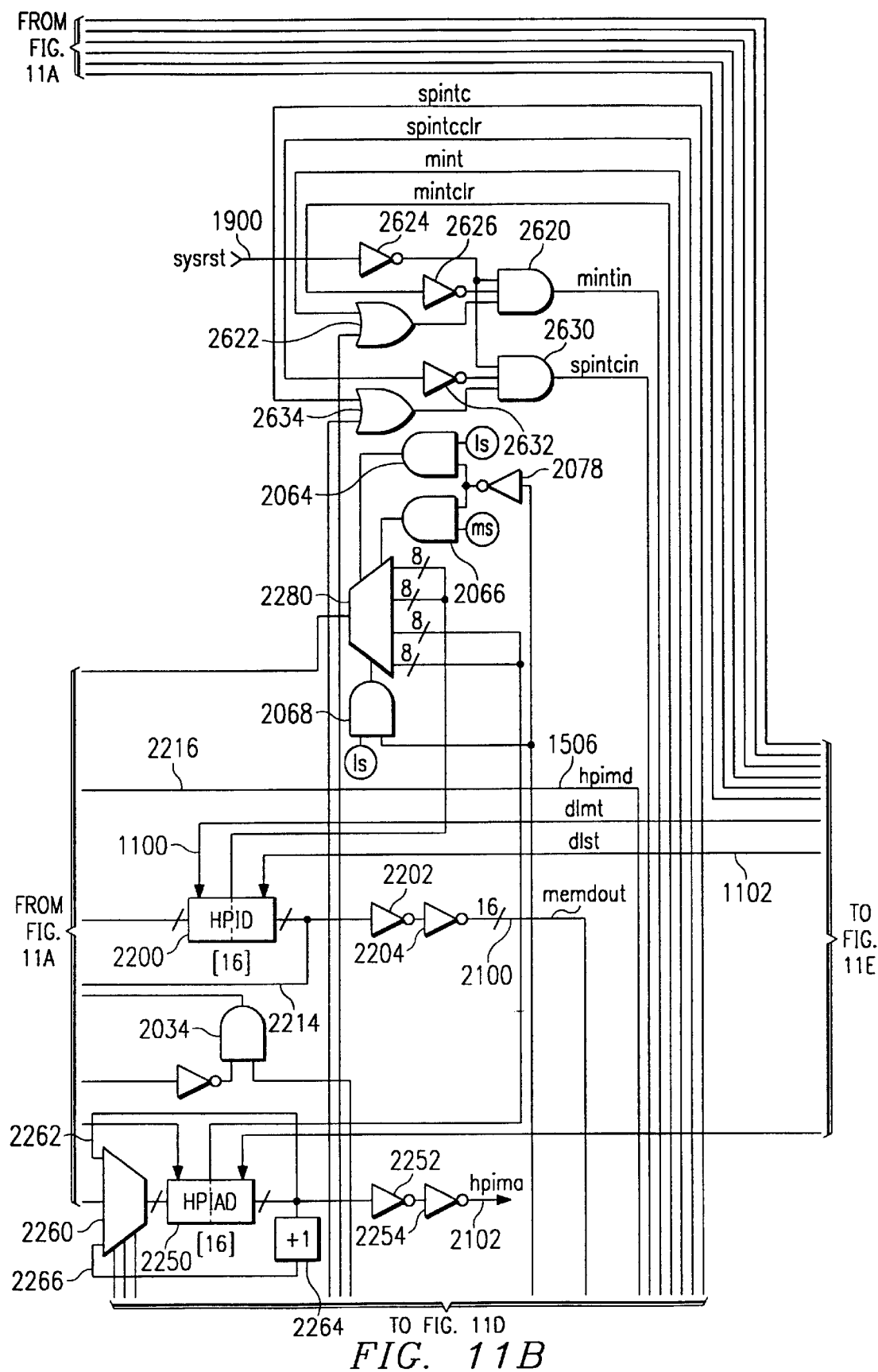
Figure 11C:
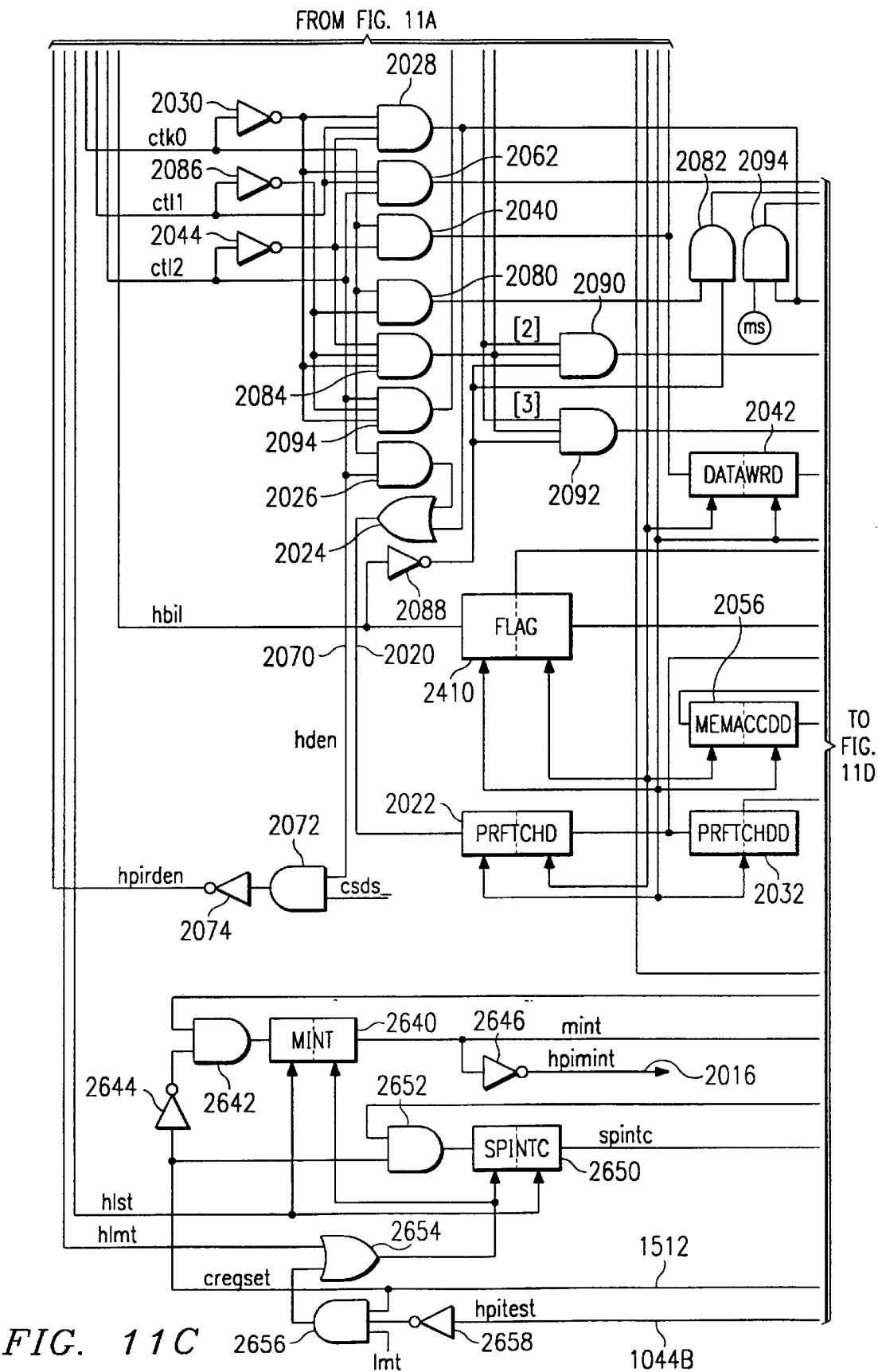
Figure 11D:
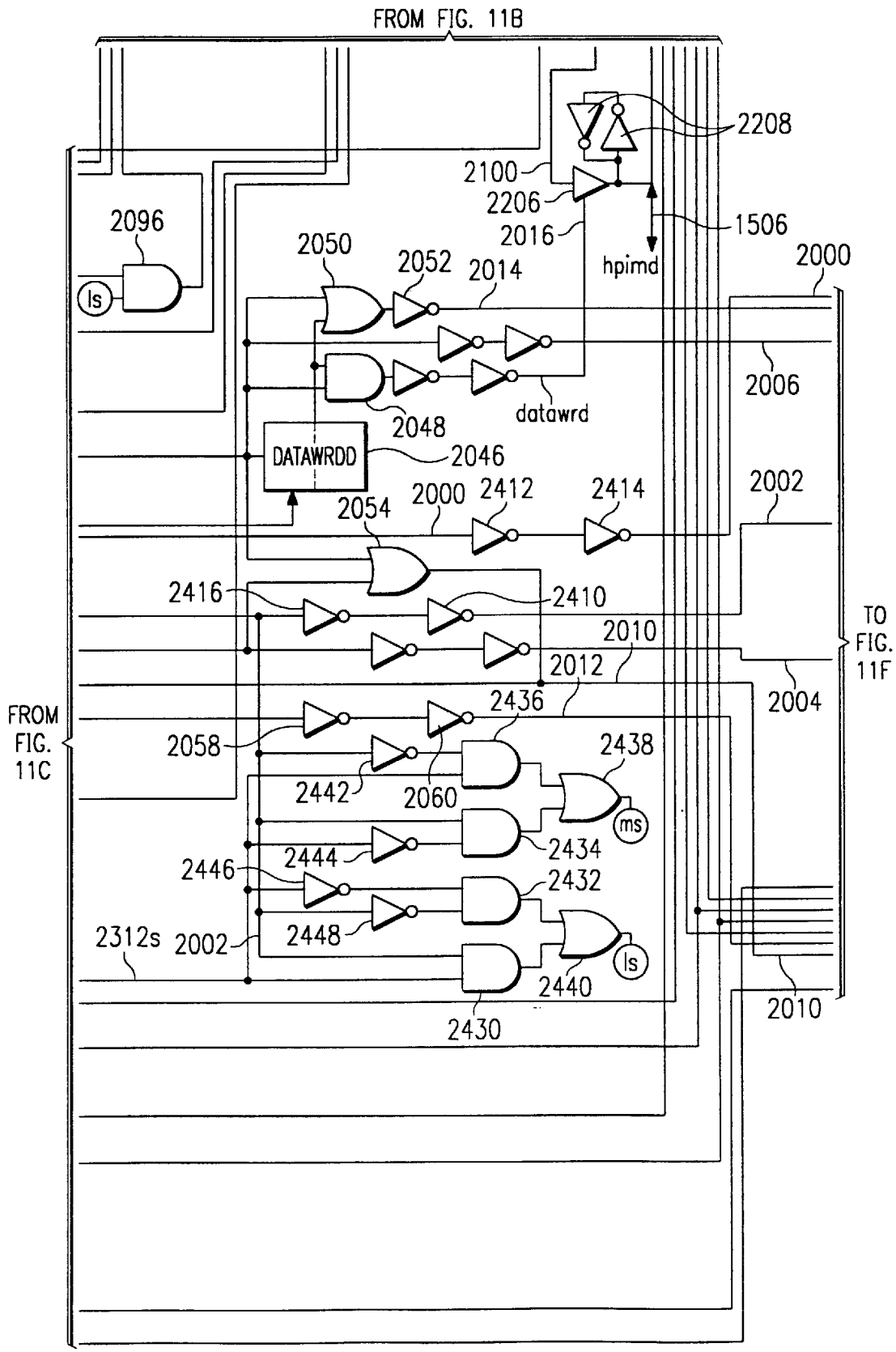
Figure 11E:
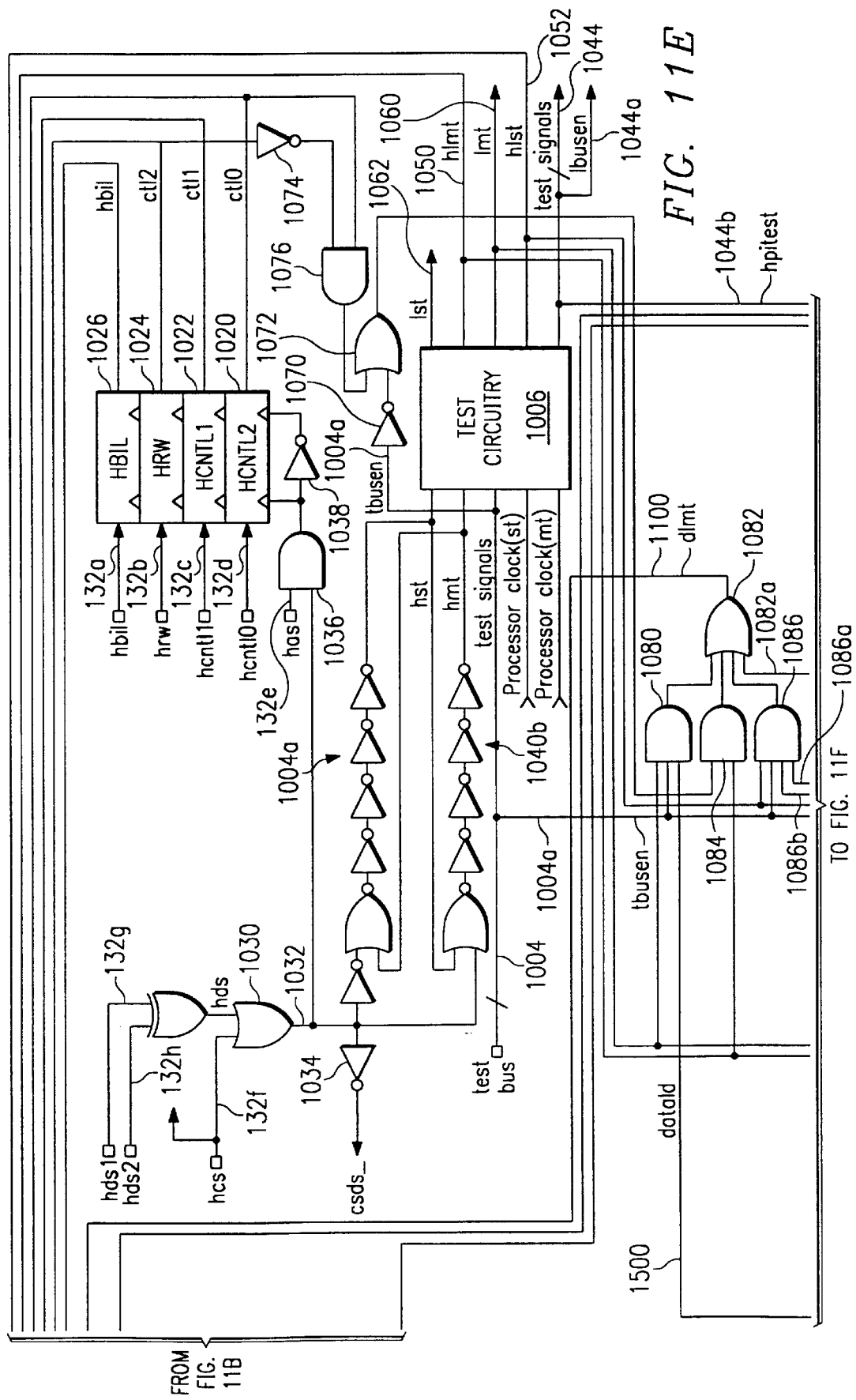
Figure 11F:
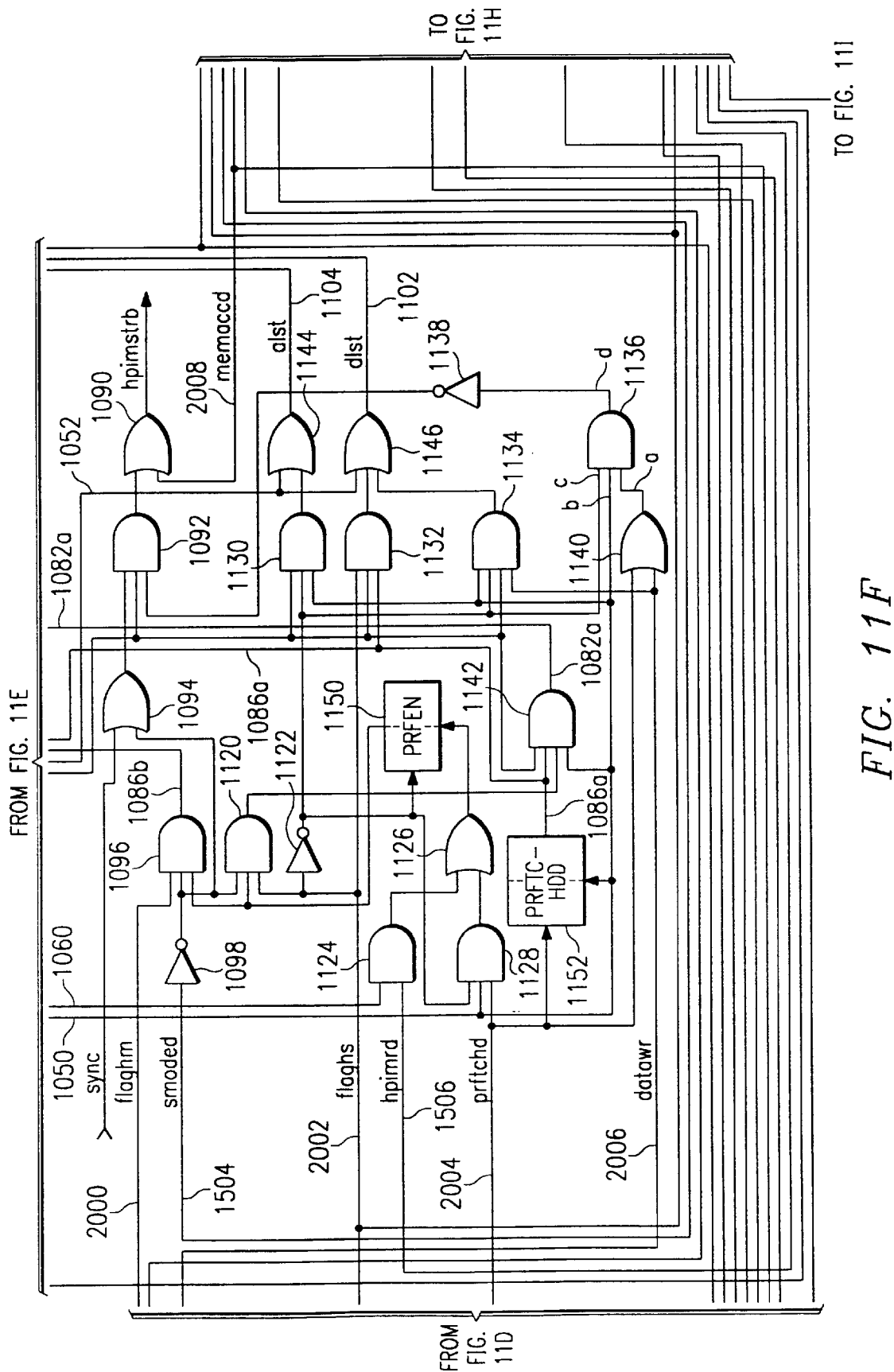

Referring now to FIGS. 11E and 11F, there may be seen the presently preferred circuitry for the clocks generating block 702 (depicted in FIG. 9). Referring now to the upper middle portion of FIG. 11E, it may be seen that there are a plurality of signals 132a–132h provided to the clock generating block 702 by the host processor 400. It may also be seen that there is a test bus 1004 which includes multiple lines carrying multiple signals and uses multiple pins so that the host port 100 is fully testable. This test bus 1004 connects to a block of circuitry labeled Test Circuitry 1006 in FIG. 11E. The detailed circuitry for the test block 1006 (depicted as a block in FIG. 11E) is depicted in FIG. 11J, which is more fully described later herein.

Referring now to the upper portion of FIG. 11E, it may be seen that each of the four control signals 132a–132d from the host processor 400 is supplied as an input signal to one of four corresponding master-slave clocked shift register latches (SRLs). More particularly, host generated control signal hcntl0 132d is supplied to a corresponding HCNTL0 SRL 1020. Similarly, hcntl1 132c, hrw 132b and hbil 132a are supplied to their respective SRLs HCNTL1 1022, HRW 1024, HBIL 1026.

The outputs from the slave portion of these latches 1020–1026 serve as internal control signals ctl0, ctl1, ctl2, and hbil which are provided to other portions of the host port circuitry, for transaction mode signal generation as noted on FIG. 11C described later herein. More particularly, it can be seen that the HBIL latch 1026 provides an hbil signal to these other portions of the circuitry. Similarly the HRW latch 1024 provides a ctl2 signal, the HCNTL1 latch 1022 provides a ctl1 signal and the HCNTL0 latch 1020 provides a ctl0 signal.

Two host generated signals, HDS1 132g and HDS2 132h, are combined in an exclusive NOR gate to provide the composite HDS signal as an output. This HDS signal is logically combined with HCS 132f in an OR gate 1030 to provide a host clock signal, csds, on line 1032. The csds signal is used in the host port circuitry as the basic clock signal from 1the host processor 400. As may also be seen by referring to FIG. 11E, the csds signal is inverted by an inverter 1034 to provide an inverted version of the csds signal, csds_. The csds signal is logically combined with the control signal HAS 132e from the host processor 400 in an AND gate 1036 and the output signal of AND gate 1036 provides the master clock signals to the latches HCNTL0, HCNTL1, HRW and HBIL 1020–1026. This same signal is inverted by inverter 1038 and used as the slave clock signal for the slave portion of these four latches 1020–1026. Thus, these latches latch their corresponding inputs on the falling edge of HAS or HDS, as noted earlier herein.

The csds signal is also provided as a separate input to one of two parallel chains 1040a, 1040b of four serial inverters with an initial NOR gate that receives the csds signal as one of its two inputs. The output from one chain is fed back as the other input to the NOR gate of the other chain. One chain 1040a has one more inverter 1042 than the other chain 1040b at the start of the chain that receives the cads signal and outputs to one input of its chain's NOR gate, and this results in the output of the host (host slave clock) and hmt (host master clock) host clock signals as depicted in FIG. 11E. That is, this portion of the circuitry is used to turn the csds signal into two non-overlapping clock signals which are used by other portions of the host port circuitry as the host slave clock and the host master clock.

These two host clock signals (hst, hmt) are then provided as inputs to the test circuitry block 1006. In addition, the master (mt) and slave (st) clock signals from the processor 300 are also supplied to the test circuitry block 1006, as are the signals on the test bus 1004.

Outputs from the test circuitry 1006 are a plurality of test signals 1044 (as depicted in FIG. 11E) and a host master clock signal 1050 and host slave clock signal 1052 (labeled hlmt and hlst, respectively), which are the two prior host clock signals hmt and hst after passing through the test circuitry block 1006. In addition, the processor clocks signals are output as lmt 1060 and lst 1062, which are the local master and local slave clock signals. These four clock signals are then used in the remainder of the host port circuitry to clock logic blocks and generate appropriate tuning and control signals for use by elements of the circuitry. When processor 300 is idled or in a sleep mode, its clocks (mt, st) may be turned off and the local version of these clock signals (lmt, lst) may not be available; when these clocks (lmt, lst) are not available, the host clock signals (hlmt, hlst) supply the necessary clock signals for proper operation of the host port circuit 100.

Although each of these clock signals lmt, lst, hlmt, hlst are depicted as a single line, preferably each such clock signal may have multiple output lines; each of the multiple output lines may be for the same clock signal but with differing amounts of gate delays. For certain portions of the circuitry the most delayed lock signal is used as the clock signal for a latch while a less delayed version of the same signal is used in logic circuitry that supplies signals to the latch; this ensures that the arrival of the latch clock signal and the arrival of resulting signals from the logic for the latch are appropriately timed.

One of the test bus 1004 signals, test bus enable (tbusen) 1004a, is also used in various portions of logic in the clock block 702 to assist in generating other clocking signals. More particularly, it may be seen in FIG. 11E that the tbusen signal is inverted by an inverter 1070 and logically combined in an OR gate 1072 with a signal that is a logical combination (AND gate 1076) of the ctl0 signal from HCNTL0 1020 and the inverted (by inverter 1074) ctl2 signal from HCNTL2 1024. The output of the OR gate 1072 is a signal that indicates a host write. As may also be seen from FIG. 11E, the tbusen signal 1004a is also used in the lower portion of the circuitry along with signals from other portions of the host port circuitry in combinatorial logic to generate appropriate control and clocking signals.

Generally speaking, the combinatorial logic on the lower half of FIG. 11E and on FIG. 11F is used to generate three clocking signals, which are dlmt 1100, alst 1104 and dlst 1102. More particularly, dlmt 1100 and dlst 1102 are clocking signals that are used in the data latches 112, 114 and are the data latch master clock and data latch slave clock, respectively. The signal alst 1104 is the address register slave clock. The input signals which are supplied to the clock block portion 702 of the host port circuitry include signals datald, sync, smoded, flaghm, flaghs, hpimrd, prftchd, datawr and memaccd.

In addition to the logic gates which utilize portions of these signals or inverted versions thereof, there are also two latches 1150, 1152 employed as part of this combinatorial logic circuitry. More particularly, there is a PRFEN latch 1150, which is the prefetch enable latch. There is also a PRFTCHDD latch 1152, which is the prefetch double delayed latch. As may be seen from FIG. 11F, these latches are clocked by a host clock signal (hlmt), or combinations of this host clock signal with other signals.

In addition to the data latch clocking signals and address latch clocking signal, this combinatorial logic circuitry generates a memory control signal, hpimstrb 1106. This is the host port interface memory strobe signal that is supplied to the memory interface logic 140.

Turning now to the details of the combinatorial logic portion of FIGS. 11E and 11F, it may be seen that the data load signal (datald) 1500, the test bus enable signal (tbusen) 1004a and the lmt 1060 signals are logically combined in an AND gate 1080 and that gate's output signal supplied as a first signal to an OR gate 1082 whose output is the data latch master clocking signal (dlmt) 1100. In addition, a second AND gate 1084 whose input signals are the host master clock signal 1050 and the host write signal (output of OR gate 1072) provides an output that is the second input to the OR gate 1082.

A third AND gate 1086 provides a third input signal to this same OR gate 1082. This third AND gate 1086 includes as input signals the host slave clock 1052, the tbusen signal 1004a and two signals 1086a, 1086b that are generated in other portions of the combinatorial logic, as described more fully hereinbelow. The fourth and final input signal 1082a to the OR gate 1082 is provided by an AND gate 1142 that has as its four input signals the host master clock signal 1050, the output of the master portion of the PRFTCHDD latch 1152, the tbusen signal 1004a and the output of an AND gate 1120. The inputs to this AND gate 1120 are the inverted (by inverter 1098) version of the smoded signal 1504, the flaghs signal 2002 and the output of the master portion of the PRFEN latch 1150.

The lmt signal 1060 (processor 300 local master clock signal) is logically combined with the hpimrd signal 1506 in an AND gate 1124 and the AND gate's output provided as one of two inputs to an OR gate 1126 whose output is the clock signal for the master portion of the PRFEN latch 1150. The other input to this OR gate 1126 is provided by an AND gate 1128 whose three input signals are the inverted (by inverter 1122) version of flaghs 2002, the host master clock signal 1050 and the pfLchd signal 2004.

The inverted version of flaghs 2002 is also supplied as an input to the master portion of the PRFEN latch 1150. The prftchd signal 2004 is also supplied as the input to the PRFTCHDD latch 1152 and as the input to an OR gate 1140 whose output signal is an input signal to a three input AND gate 1136 whose output signal is inverted by inverter 1138. The output of the inverter 1138 is logically combined in an AND gate 1092 with two other input signals; the output of AND gate 1092 provides one input to OR gate 1090 whose output is the hpimstrb signal 1106.

More particularly, the hpimstrb signal 1106 is the output of the two input OR gate 1090. One of those inputs is the memaccd signal 2008, while the other input signal is the output of the three input AND gate 1092. One input of this three input AND gate 1092 has been previously described hereinabove. A second input to this three input AND gate 1092 is the tbusen signal 1004a, and the third input signal is the output of an OR gate 1094 which logically combines the sync signal 1502 and the inverted (by inverter 1098) smoded signal 1504.

The data latch slave clock signal 1102 is the output of a three input OR gate 1146. One input of this OR gate 1146 is the host slave clock signal 1052. The remaining two inputs are generated by two separate AND gates 1132, 1134. The first of these two AND gates 1132 has three input signals; these input signals are flaghs 2002, tbusen 1004a and the output of the master portion of the PRFTCHDD latch 1152. The second AND-gate 1134 has four inputs; these four inputs are the inverted (by inverter 1122) version of flaghs 2002, tbusen 1004a, the host master clock signal 1050 and the datawr signal 2006.

The datawr signal 2006 is also supplied as one input to a two input OR gate 1140; the second input to the OR gate 1140 is the prftchd signal 2004. The output of this OR gate 1140 is one of the three inputs to an AND gate 1136 whose output was described earlier. The other two inputs to the three input AND gate 1136 are the host master clock signal 1050 and the inverted version of the flaghs signal 2002.

Thus, the host port logic uses two separate sets of clock based signals for functional operation. The processor clock signals are used to control synchronous events, such as interrupt synchronization and control, SAM/HOM control, and the synchronization of the memory logic in the SAM mode. The clock signals based on external host signals are used to control the address and data latches, part of the control register, output drivers for the HD bus, and memory logic in the HOM mode. In the HOM mode, the host port 100 depends entirely on these host based clock signals to allow for operation, even when the processor 300 is in an IDLE or sleep mode, as well as allow for faster host accesses.

Although the foregoing logic has been generally described and depicted in positive logic, clearly, negative versions of this same logic may be employed to generate the same signals. In some instances negative logic may actually be preferred, as negative logic generally has shorter clocking delays. Accordingly, it should be clearly understood that both positive logic, negative logic, and/or combinations of positive and/or negative logic may be employed to generate the appropriate control and/or clocking signals utilized in the host port circuitry. Similarly, different logic elements may be arranged to accomplish the effect of one or more other elements; for example (but not limited to) a mux may be replaced by two NOR gates each of whose inputs are one of the mux's inputs and one of the mux control signals and whose outputs are the two inputs to an AND gate whose output is equivalent to the mux's output.

Referring now to FIG. 11J, there may be seen the presently preferred circuitry for the test circuitry block 1006 depicted in FIG. 11E. Continuing to refer to FIG. 11J, there may be seen to be a dashed line which separates the generally upper test portion of the test circuitry and the clock selection circuitry which is below this dashed line. More particularly, it may be seen from FIG. 11J that there is a scan-in 1200 and scan-out 1220 signal. This is a conventional data scan-in and scan-out path associated with a conventional JTAG test port. The small, light dashed line interconnecting the various elements of FIG. 1 represents the scan path for data to be scanned into and out of all the SRLs in circuit 100 so that they may be tested and thereby circuit 100 may be filly tested. In addition, it may be seen that there is a global bus on (tbuson) signal 1212 and a global bus enable (tbusen) signal 1004a, which are both part of the test bus 1004 of FIG. 11E, that are used in combination with other test bus signals to control which clocks are selected and are also utilized for test control purposes.

Further, it may be seen that there is a global test slave clock (gtst) 1204, a control test clock (cltt) 1202, a data test clock (dltt) 1206, a jtm test mode (sftj) 1208 and a functional clock enable (fclken) 1210 signal that are part of the test bus 1004. These various test bus signals are then used in combination with inverters, logic gates to generate certain output test signals, such as local bus enable (lbusen) 1044a, local test clock (ltt) 1222 and host port test (hpitest) 1044b. These output test signals are part of the output test bus 1044.

For example, the lbusen signal 1044a is the output of a two input OR gate 1242. The two inputs to this OR gate 1242 are the tbuson signal 1212 and the output of a two input AND gate 1240. The two inputs to the AND gate 1240 are the output of the MBENB latch 1232 and the tbusen signal 1004a.

The input clock signals to the test circuitry block are the processor master and slave clocks, mt and st, respectively, and the host master and slave clock signals, hmt and hst, respectively. As may be seen, each of the processor clock signals (mt and st) is provided as one input to a multiplexer 1300, 1310 whose output is the local master (lmt) 1060 and slave (lst) 1062 clocks, which are the processor clock signals used by the remainder of the host port circuitry. The other input to the multiplexer 1300, 1310 for the lmt and lst clock signals is provided by the output of a second multiplexer 1302, 1312 whose two inputs are ground for the master clock mux 1302 and VDD or gtst for the slave muxc 1312. This technique is used to allow for the inputs to master-slave SRL latches to be ignored when in a test mode by grounding (or zeroing) the master clock signal, while having an option (depending upon the test mode) of having the slave clock either tied to VDD, in which case signals can pass through the latch unimpeded, or having the slave portion of the latch clocked by the gtst signal.

In a similar manner, the host master and slave clock signals are input to respective multiplexers 1320, 1330 and their outputs are the respective host master (hlmt) 1050 and host slave (hlst) 1052 clock signals, which are used throughout the remainder of the circuitry for the host port. The other input for these multiplexers 1320, 1330 is the output from a series of chained multiplexers 1322, 1324, 1326, and 1332, 1334, 1336. The chained series of multiplexers 1322, 1324, 1326 and 1332, 1334, 1336 basically allow for the processor master clock signal (mt) to be provided as the host master clock signal (hlmt) under appropriate test circumstances and similarly for the host slave clock signal (hlst), the processor slave clock signal (st) may be employed as the host slave clock signal under appropriate test circumstances.

In addition, the host master clock signal (hlmt) may be tied to ground, for the reasons noted hereinabove. Similarly, the host slave clock signal (hlst) may be appropriately tied to VDD, for the reasons described hereinabove with respect to the processor slave clock mux 1310.

In the normal or functional mode, busen 1004 is high and sftj 1208 is low which enables hmt to the asynchronous logic as hlmt 1050, via mux 1320, and similarly for hlst 1052. If the processor 300 is not in IDLE, fclken 1210 will be low which enables mt to the synchronous logic as lmt 1060, via mux 1300, and similarly for lst 1062. In IDLE, fclken will be high which turns off mt, via mulx 1300; this is allowed since the memory may be accessed asynchronously in the HOM mode. In a scan mode, busen 1004 will go low and test 1044 will go high (if the module is selected) and the processor test clocks are supplied to the synchronous logic, via muxes 1312, 1310 and to the asynchronous logic, via muxes 1336, 1334, 1332, 1330. In the stuck fault mode sftj will go high, busen will remain high and test will go high; this enables the processor clocks to be supplied to the synchronous logic, via muxes 1300, 1310 and to the asynchronous logic, via muxes 1320, 1322, 1324 and 1330, 1332, 1334. Using this implementation, all but five SRLs are scannable. The only ones that are not are either directly controllable from pins (HCNTLs, HRW, and HBIL) or have special test logic associated with them (SYNC).

Figure 11G:
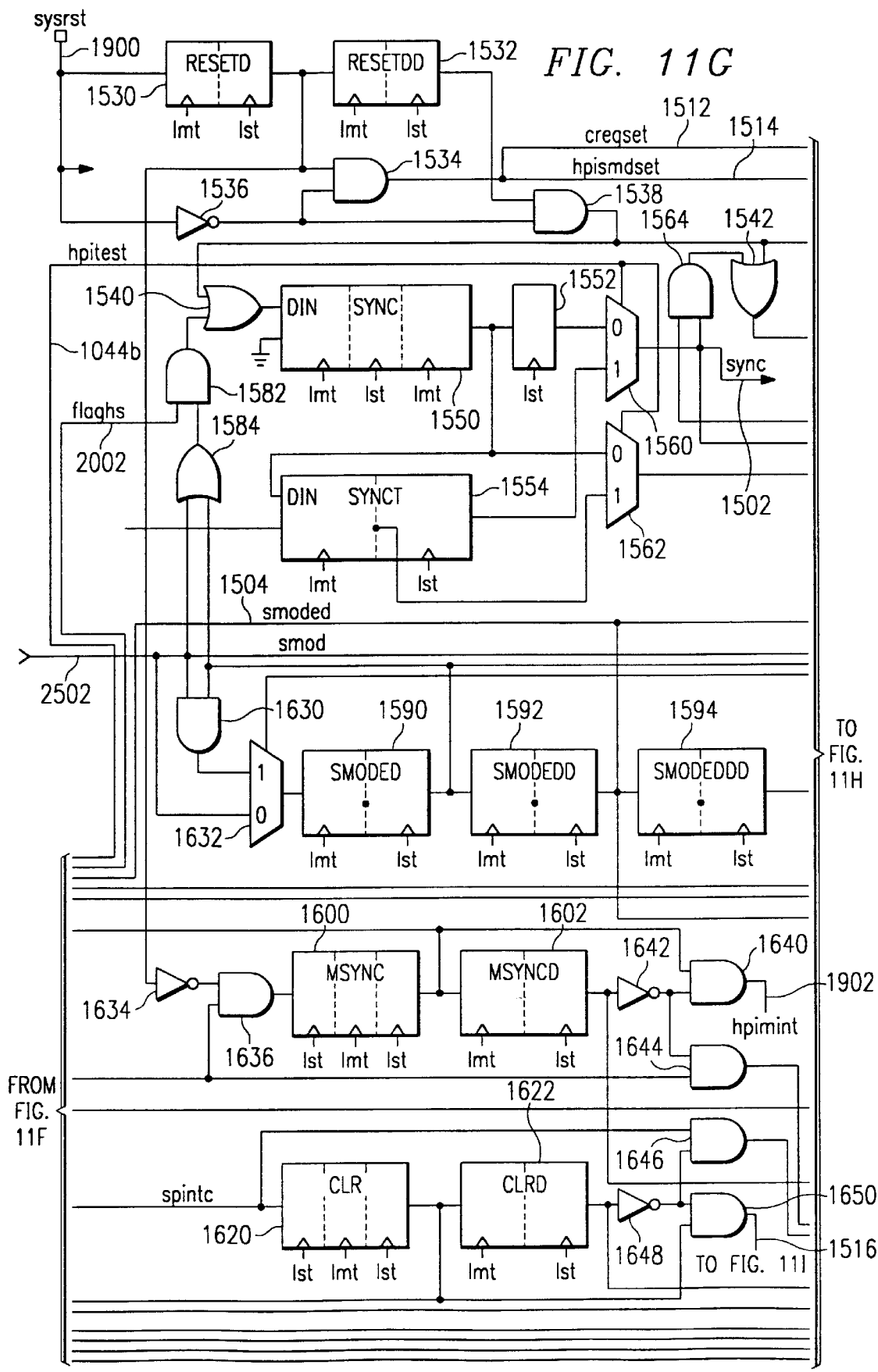
Figure 11H:
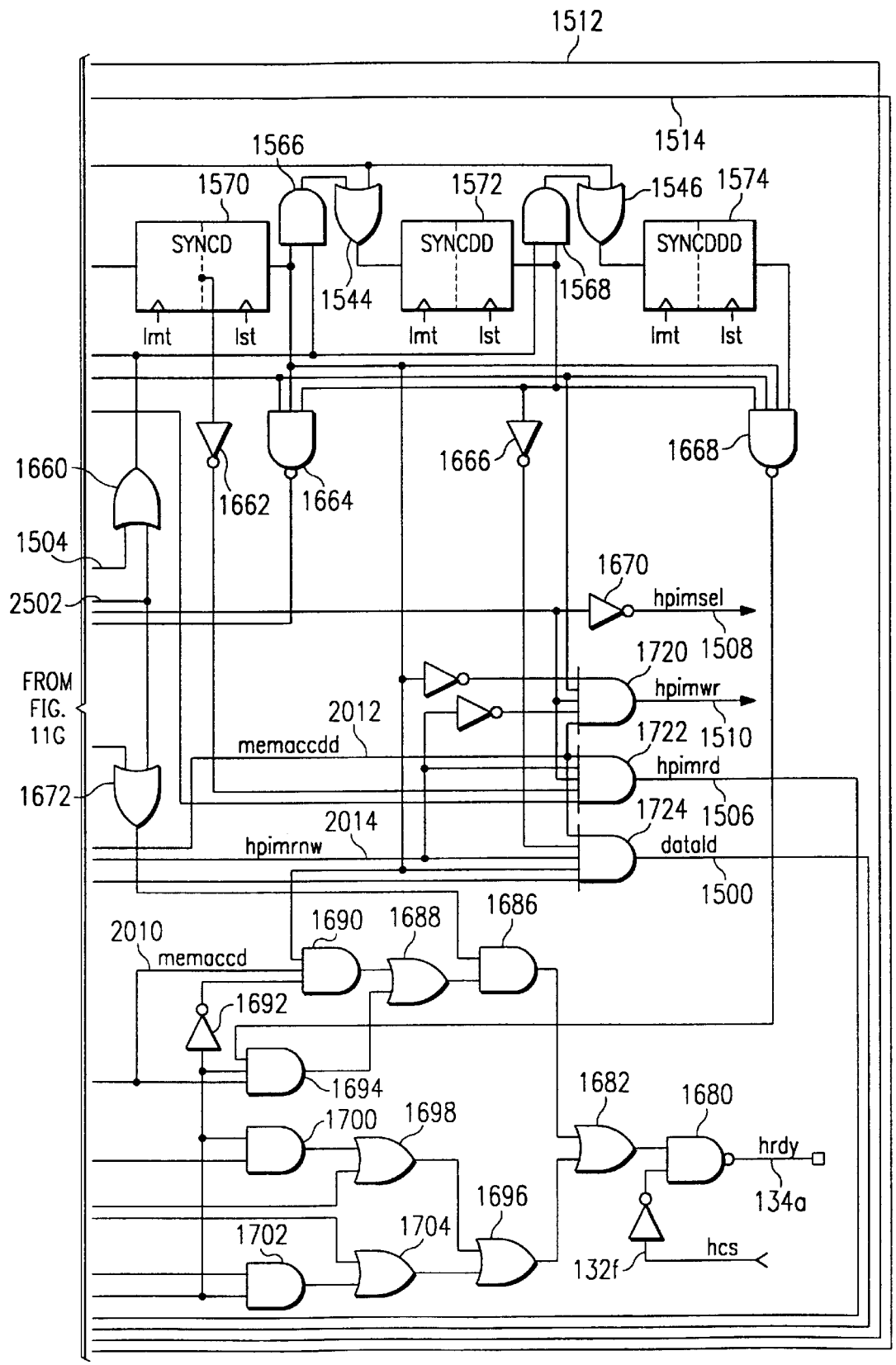

Referring now to FIGS. 11G and 11H, there may be seen the presently preferred circuitry for the processor clocked block 704 (depicted in FIG. 9). That is, the plurality of latches that are employed in this portion of the host port circuitry are locked by the processor clock signals lmt and lst. This portion of the host port circuitry takes certain signals from the portion of the host clocked circuitry 706 and synchronises them with the processor clock signals to allow them to be used as inputs to the processor 300 and/or the memory interface circuit 140 (in the SAM mode).

Referring to FIG. 11G, it may be seen that two latches, reset delayed (RESETD) 1530 and reset double-delayed (RESETDD) 1532, are employed to partially generate two control signals, cregset 1512, hpismdset 1514, one of which (cregset) is used to reset bits in the control register 150. The input signal to the master portion of the reset delayed latch 1530 comes from the processor 300 system reset signal (sysrst) 1900. The master and slave portions of the reset delay latch 1530 are, as noted above, clocked using the lmt and lst clock signals; similarly, the clock signals for the reset double-delay latch 1532 are lst and lmt.

The output of the slave portion of the reset delay latch 1530 is provided as the input to the maeer portion of the reset double delay latch 1532. The output of the slave portion of the reset double delay latch 1532 is used in combination with an inverted form of the sysrst signal (inverted by inverter 1536) as inputs to an AND gate 1538 whose output signal supplies a syncset signal.

The output of the slave portion of the reset delay latch 1530 is also used as one of the inputs along with the inverted sysrst signal 1900 (as the other input) to an AND gate 1534; the output of this AND gate 1534 provides two output signals, cregset 1512 and hpismdset 1514.

In order to allow the host 400 to download code to the host port 100 while the processor is in reset, the SMODE bit is cleared and the host port immediately goes into the HOM mode when sysrst 1900 goes high. When the processor 300 comes out of reset, the host port performs four functions: 1) the SMODE bit is set to one(SAM) to allow the processor 300 to access memory 200, 2) the MINT interrupt bit is reset to zero to avoid spurious interrupts, 3) the SPINTC bit is reset to zero to allow the processor 300 to interrupt the host 400, and 4) the SYNC, SYNCD, SYNCDD, SYNCDDD latches are reset to one to allow for a proper HOM to SAM transition.

The host 400 preferably does not access the host port for six cycles before sysrst falls to ensure the SAM to HOM change does not occur during an internal memory access. The host 400 preferably does not access the host port for four cycles after sysrst fells to ensure that the SMODE bit will be stable after the sysrst signal rises asyndhronously. The host 400 preferably does not access the host port for twenty cycles after sysrst rises to ensure that hlmt will stay low for four cycles while the various registers are set/reset. If the host 400 does not access the host port during reset, then the BOB, HPIAD, HPID, and FLAG SRL remain unmitialized until the first host access.

The SYNC latch 1550 is used to synchronise a signal generated by the host clock driven portion of the host port circuitry to the processor clocks. More particularly, the flaghs signal 2002 from the host clock driven portion of the circuitry is logically comined with the smodres signal in an AND gate 1582. The output of this AND gate 1582 is then logically combined in an OR gate 1540 with another input which is the syncset signal from AND gate 1538. The output of this OR gate 1540 is the input to the SYNC latch 1550. The normal scan-in input for SYNC latch 1550 is connected to ground and accordingly, latch 1550 is not part of the scan chain of SRLs in the host port circuit. A more detailed discussion of an SRL circuit (FIG. 12) is provided later herein. The output of the SYNC latch 1550 is provided as one input to a single latch 1552 whose output is one input to multiplexer 1560 which supplies, as its output signal sync 1502, which is the flais signal synchronised to the processor slave clock signal (lst).

The output of the SYNC latch 1550 is also provided as one input to a second multiplexer 1562 whose output is also a sync signal, but synchronised to the master processor clock signal (lmt), and is provided as the input to the SYNCT latch 1554. The output of the master portion of the SYNCT latch 1554 is the other input to multiplexer 1562. The other input for the multiplexer 1560 is the output of the slave portion of the SYNCT latch 1554. Again, the SYNC and SYNCT latches are driven by the lmt and lst clock signals.

The control signal for the two multiplexers 1560, 1562 associated with the sync signals is the (preferably doubly inverted) hpitest signal 1044b. The SYNCT latch 1554 allows for scan in testing of the sync chain, via mux 1552; this is necessary since the scan in input for the SYNC latch 1550 is grounded. The sync signal 1502 is then used in other portions of the circuitry to generate appropriate control signals as described more fully hereinbelow.

More particularly, the sync signal synchronised to the slave clock (syncs) is used as an input to several AND or NAND gates in conjunction with other signals to then directly or indirecdy generate control signals that are needed by various portions of the host port circuitry. In addition, the sync signal 1502 is used in combination with other signals to provide inputs to a series of synch delay latches, SYNCD 1570, SYNCDD 1572, and SYNCDDD 1574. For example, the sync signal 1502 is used in combination with other signals to provide an input to the SYNCD latch 1570.

The output of the SYNCD latch 1570 is then logically combined in an AND gate 1566 with the output signal from an OR gate 1660 that is the result of logically combining an smoded signal 1504 (which is the output of the SMODE double delayed latch 1592) and an smod signal 2502. The output of AND gate 1566 is supplied as one input to an OR gate 1544 and the other input to OR gate 1544 is the syncset signal from AND gate 1538. The syncset signal sets the sync chain of latches after reset and the smodres signal resets this sync chain in the HOM mode. The output of the OR gate 1544 is then provided as the input to the SYNC double delay latch (SYNCDD) 1572.

The output of the mux 1560 (which is sync 1502) is logically combined in an AND gate 1564 with the signal from the OR gate 1660. The output of the AND gate 1564 is then logically combined in an OR gate 1542 with the snycset signal from AND gate 1538. The output of this OR gate 1542 is then supplied as the input to the SYNC delayed latch (SYNCD) 1570.

In a similar manner, the output of the SYNCDD latch 1572 is logically combined in an AND gate 1568, again, with the signal from the OR gate 1660. The output of the AND gate 1568 is then logically combined in an OR gate 1546 with the syncset signal from AND gate 1538. The output of this OR gate 1546 is then supplied as the input to the SYNC double delay delayed latch (SYNCDDD) 1574.

The output of the SYNCDDD latch 1574 is provided as an input to a four input NAND gate 1668. The other three inputs to this four input NAND gate 1668 are the output of the SYNCD latch 1570, the SYNCDD latch 1572 and the sync signal 1502. The output of this four input NAND gate 1668 is used in conjunction with other signals as described later herenbelow.

The SMODE delay latch (SMODED) 1590 has an input signal that is the output of a mux 1632, whose input signals are either the smod signal 2502 or the smod signal 2502 logically combined in an AND gate 1630 with the output signal of the SMODED latch 1590. The control signal for this mux 1632 is the output signal of a three input NAND gate 1664, whose input signals are the output of the SYNCD latch 1570, the sync signal 1502 and the output of the SYNCDD latch 1572. The output of the SMODED latch 1590 is also provided as an input to the SMODE double delay latch (SMODEDD) 1592. The output of the SMOD-EDD latch 1592 is provided as an input to the SMODE double delay delayed latch (SMODEDDD) 1594.

The thee latches, SMODED 1590, SMODEDD 1592 and SMODEDDD 1594 are again clocked by the lst and lmt signals. The output of the SMODEDD latch 1592 is also provided as an output signal, smoded 1504. The output of the SMODEDDD latch 1594 is used as a signal in conjunction with other signals to generate some additional control signals descnbed later herein. The SMODE reset (smodres) signal is provided as the output of an OR gate 1584 and is the result of the logically comning the reset SMODE signal (smod) 2502 and the output of the SMODED latch 1590. The data load signal (datald) 1500 is the result of logically combining the five input signals of tlhe output of the SYNCD latch 1570, the inverted output of the SYNCDD latch 1572, the output of the SMODEDD latch 1592, the input signal hpimrnw 2014 and the input signal memaccdd 2012. An output signal hpimrd 1506 (to the memory control logic 140) is a memory read request and is the output of a five input AND gate 1722; the inputs to the AND gate 1722 are the hpimnw signal 2014, the output of mux 1562, the inverted (by inverter 1662) output of the master portion of the SYNCD latch 1570, the output of the SMODED latch 1590 and the memaccdd signal 2012.

The input to MSYNC latch 1600 is the output of an AND gate 1636 whose two input signals are the inverted (by inverter 1634) output of RESETD latch 1530 and a signal that represents a host interrupt of the processor (hint) (see MINT SRL in FIG. 11C) from the control register block 708. Note that for ease of depiction purposes, this hint signal circuitry and other portions of the control register block 708 are included in the FIGS. 11A–11D for the host clocked block 706. The output of the MSYNC latch 1600 is provided as an input to the MSYNC delay latch (MSYNCD) 1602. Both the MSYNC and MSYNCD latches employ the lst and lmt clock signals. The MSYNC latch 1600 synchronies the host generated interrupt signal to the processor 300 with the processor clocks and the MSYNCD latch 1602 provides this signal as an output after one cycle delay. The output of the MSYNC latch and the MSYNCD latch are also used in subsequent logic to generate other control signals as described more fully hereinbelow.

The host clear of a processor interrupt signal (spintc) (also from FIG. 11C) is provided as an input to the dear (CLR) latch 1620. The output of the CLR latch 1620 is provided as an input to the clear delay latch (CLRD) 1622. The CLR and CLRD latches are clocked by both the lst and lmt signals. The CLR latch 1620 synchronises the host clear interrupt signal to the processor clocks. The output of the CLR latch 1620 is combined with the inverted (by inverter 1648) output of the CLRD latch 1622 in an AND gate 1650 and the output signal 1516 from the AND gate 1650 is provided as an input signal to the control register block 708 (see FIG. 11I); this signal is hpiclrint 1516, which is the host port interface clear interrupt signal. In addition, the output of the CLR latch 1620 is provided as a control signal, spintcclr; this signal is the host clear interrupt signal used in FIG. 11B.

An additional memory control signal (hpimwr) 1510 is the output of a five input AND gate 1720. The hpimwr signal is a write signal to the memory interface logic 140. The inputs to the five input AND gate 1720 are the inverted (by inverter 1706) hpimrnw signal 2014, the snyc signal 1502, the output of the SMODED latch 1590, the memaccdd signal 2012, and the inverted (by inverter 1704) output of the slave clock portion of the SYNCD latch 1570. A further memory control signal (hpimsel), or HPI memory select, is the inverted (by inverter 1670) output of the SMODED latch 1590.

An internally needed signal mintdir is generated by taking the output of the MSYNC latch 1600. The output of the MSYNC latch 1600 is also logically combined in an AND gate 1640 with the inveted (by inverter 1642) output of the MSYNCD latch 1602; the output of the AND gate 1640 provides the synchronised interrupt signal hpimint 1902 to the processor 300.

The remainder of the logic of FIGS. 11G and 11H takes the inverted (by inverter 1684) host external signal hcs 132*f* and combines it in a NAND gate 1680 with an internally generated signal from OR gate 1682. The output of the NAND gate 1680 provides the hrdy signal 1520 to tlhe host processor 400.

The hrdy signal is generated for three types of accesses: 1) host data read/write in SAM mode, 2) write to DSPINT bit during SAM or HOM , 3) write to HINT bit during SAM or HOM. For each of these three accesses hrdy goes low when HDS goes high at the end of each byte. This allows the host 400 to sample hrdy and extend the next access if needed. The hrdy signal goes high again after the internal access or synchronization is complete or when HCS goes high.

For SAM host writes, the second byte is extended until SYNCD goes low by the signal from AND gate 1690 toensure the sync chain is low and a rising edge of HDS can be detected when HDS rises again. For SAM host reads, the second byte is extended until SYNCD goes low by the signal from AND gate 1690, as noted previously and for the same reason. The first byte of the next access is extended until SYNCDDD is high by the signal from AND gate 1694 to allow sufficient time for the data to move from the md bus, through the data latches and onto the HD pins before HDS is allowed to go high and the host 400 latches the data.

The host port allows for changing the SMODE bit on the fly while the host 400 continues its accesses. The hrdy signal slows down the host if necessary for the synchronizers to get set. If the mode dianges from HOM to SAM during the second byte of a memory access, hrdy remains high until HDS rises; that is, because the sync chain is aleeady low (since the syncs are reset to zero in HOM mode) there is no need to delay the host access. If the mode changes from HOM to SAM during the first byte after a host data access, hrdy will immediately go low when smode goes high; this is necessary to extend the host cycle so that the synchronizers may get to their proper state. If the mode changes from SAM to HOM during a host data access, hrdy will stay low until the memory access is complete and the internal synchronization is no longer necessary.

The signal representing the SMODE bit from the control register goes into a string of delays. The SMODED master portion generates the hpimsel signal for HOM mode accesses. The SMODED slave portion qualifies synchronous memory access signals (hipmrd, hpimwr) so that they are only available in the SAM mode and resets the sync chain in the HOM mode. The SMODEDD slave portion qualifies synchronous data latch signals (datald, prefen), resets the sync chain in HOM mode, and generates the hpim b signal under certain SAM to HOM transition cirs ces. The SMODEDDD slave portion enables hrdy during the SAM mode. The actual mode change from HOM to SAM (SMODED goes high) may be delayed by a "window" signal (defined by the signal from NAND gate 1664) from the sync chain to avoid spurious accesses; since SMODED qualifies all synchronous memory signals, they will remain low for the current host access.

The internally generated signal is the result of logically combining the output of AND gate 1686 with the output of OR gate 1696 in OR gate 1682. The two inputs for AND gate 1686 are the output of OR gate 1672 and the output of OR gate 1688. The two inputs for OR gate 1672 are the smod signal 2500 and the output of the SMODEDDD latch 1594. The two inputs for OR gate 1688 are the output of AND gate 1690 and the output of AND gate 1694. The three inputs to AND gate 1690 are the output of the SYNCD latch 1570, the memaccd signal 2010, and the inverted (by inverter 1692) flaghs signal 2002. The three inputs to AND gate 1694 are the gs signal 2002, the memaccd signal 2010, and the output of five input AND gate 1668.

The two inputs to OR gate 1696 are the output of OR gate 1698 and the output of OR gate 1704. The two inputs to OR gate 1698 are the output of AND gate 1700 and the output of AND gate 1644. The two inputs to AND gate 1644 are the inverted output of the MSYNCD latch 1602 and the mint signal. The two inputs to AND gate 1700 are the flaghs signal 2002 and the output of the SYNCD latch 1602. The two inputs to OR gate 1704 are the the output of AND gate 1646 and the output of AND gate 1702. The two inputs to AND gate 1646 are the inverted (by inverter 1648) output of the CLRD latch 1622 and the spintc signal (the input to the CLR latch 1620). The two inputs to AND gate 1702 are the flaghs signal 2002 and the output of the CLRD latch 1622.

Referring now to FIGS. 11A 11B, 11C and 11D, there may be seen that block of the circuitry 706 of the host port circuit that is clocked by host clock signals. More particularly, it may be seen that the sixteen data latches (HPID) 2200 and sixteen address latches (HPIAD) 2250 are part of this block of the host port circuit; as noted earlier herein, although there are sixteen of each of these latches, only one is depicted for clarity and ease of discussion purposes. The data latches 2200 correspond to latches 112, 114 in FIG. 1 and the address latches 2250 correspond to the address latches 122, 124 in FIG. 1. However, the lines to and from the latches are depicted as multiconductor by the use of the slash across their inputs and outputs. A bracketed number under the latches indicates the number of such latches.

As depicted in FIG. 11A, the data from the host (hdin) 402i is separately provided as an input to a multiplexer 2210 for the data latches 2200 and to a multipler 2260 for the address latches 2250 (FIG. 11B); again, although depicted as a single multiplexer (mux), each mux 2210, 2260 may be multiple multiplexers. Note that the data latches 2200, address mux 2260, and address latches 2250 are depicted in FIG. 11B.

The data latches 2200 are clocked by the dlmt 1100 and dlst 1102 clock signals; they require special doclk because the latches are loaded differently for writes, SAM reads, and HOM reads. The data latches 2200 output their slave portion signal to two seal inverters 2202, 2204 (that serve to shape and stabilize the output signals) and then to a tristatable driver 2206 whose output is supplied to the memory interface circuit 140 as an input (hpimd) 1506 and a series of latches 2208 are connected to hpimd 1506 that serve as bus keepers. The outputs 2220 of the master portions of the een data latches 2200 are provided as two eight bit wide inputs (a most significant byte and a least sipificant byte) to a data/address output multiplexer 2280 whose output is supplied, via a host input multiplexer 2290, to the host processor 400 via the data out pins (hdout) 402o.

The outputs of the slave portions of the sixteen data latches are provided as one sixteen bit wide input 2214 to the data latch input multiplexer 2210; the other input 2216 to this multiplexer 2210 is the data input signal from the memory interface (hpimd) 1506. Thus, the memory interface 140 may both send data to and receive data from the data latches HPID 2200 via the host port memory data lines (hpimd) 1506. Although depicted as a single multiplexer for ease of depiction puxposes, the data latch input mux 2210 preferably is two sets of two serially chained multiplexers; one set is for the most significant byte (bit positions [8–15]) and the other set is for the least significant byte (bit positions [0–7]). Thus, multiple control lines are connected to the data latch input multiplexer 2210.

The address latches 2250 are clocked by the hlmt 1050 and alst 1104 clock signals and then output their slave portion signal to two serial inverters 2252, 2254 (for shaping and stablizing) whose output (hpima) 2102 is then supplied to the memory interface circuit 140. The outputs 2270 of the master portions of the sixeen address latches 2250 are provided as the other two eight bit wide inputs (a most significant byte and a least significant byte) to the data/address output multiplexer 2280. The outputs of the save portions of the address latches 2250 are also provided as an input 2262 to the address latch input multiplexer 2260.

The outputs of the slave portions of the address latches are also provided as one sixteen bit wide input to an incrementer 2264 whose output is supplied as the other input 2266 to the address input latch multiplexer 2260. Although depicted as a single multiplexer, the address latch input mux 2260 preferably is two sets of two serially chained multipl:ers; one set is for the most significant byte (bit positions [8–15]) and the other set is for the least significant byte (bit positions [0–7]). Thus, multiple control lines are connected to the address latch input multiplexer 2260.

At the end of an address latch write, the memory is read from (at that newly written address) using the prefetch mechanim, to allow for the data to be available for the next host access. In order to allow the new address to have sufficient setup time with respect to the HOM memory strobe (hpimstrb) which occurs at the end of the second byte, the address latches use a special slave clock signal (alst). This slave clock signal allows the address to be passed through the address latch from the HD bus to the memory during the second byte of the access. In SAM mode the previous memory access may be delayed and occur while HDS is low for the first byte of the next write to the address latches; thus, the address can not be passed through transparently for the first byte, as it is for the second byte. In a similar manner, the data latches pass through the second byte since the dlst clock is simiarto the alst clock in the HOM mode.

Refernng again to FIG. 13A, the zeroth [0] bit position of the data from the host (hdin) 402i is provided as one input to a bob input multiplexer 2300 whose output is the input to the master portion of the BOB latch 2310. The other input 2302 to the bob input mux 2300 is the output of the slave portion of the BOB latch. The output of the master portion 2312m of the BOB latch is provided as an input to the host input multiplexer 2290 (for line [0]). The output of the slave portion 2312s of the BOB latch is supplied as an input 2302 to the input mux 2300 for the BOB latch 2310 and is also used in combination with other signals to generate selected control signals for use in other portions of the circuitry, as described more fully hereinbelow. The BOB latch 2310 is used to store the bob signal value; the bob signal value determines the byte order, e.g. most significant byte first or least significant byte first.

As may be seen from FIG. 11C, the output signals from the four host control signal latches 1020–1026 (found in the clocks portion 702 of the circuit depicted in FIG. 11E) are generally used to determine the transaction mode of the host port circuit. More particularly, the trasaction mode is based upon the values of the two control signals (hcntl0 and hcntl1) and the value of the control signal hrw. The values for these signals are updated on the falling edge of the internal clock signal (csds) or has, whichever comes first (as depicted in FIG. 11E).

More particularly, these three host generated control signals are used in various logical combinations to generate control signals for address latches write, address latches read, data latches write (with an optional address auto preincrement), data latches read (with an optional address auto post-increment), control register write, control register read, and a memory prefetch. These control signals are then combined with other signals to cause the address latches to be written, the address latches to be read, the data latches to be written (with or without an address auto pre-increment), the data latches to be read (with or without an address auto postincrement), the control register to be written, the control register to be read, and a memory prefetch, as described more fully hereinbelow.

In order to simplify the memory access logic and make the host processor cycle time shorter, a data prefetch mechanism is employed. This means that a memory access occurs at the end of an address latch write, or a data latch read or write. That is, data is read from memory at the end of each address latch update and this data is latched into the data latches HPID so that it is available for the next HPID read access. For a read followed by a read, the data fetched at the end of the first read is the data that will be read (sent to the host processor) on the second HPID read. For a write followed by a read, the host processor will read the data that was just written into the data latches.

The prefetch mechanism uses a prefetch control signal that is delayed until the rising edge of csds. The delayed prefetch control signal (prftchd) 2004 is used to ensure that the newly read data is loaded into the data latches HPID 2200, even if csds falls before the data is available and the transaction mode changes. On transition from SAM to HOM, the prefetch logic prevents a possible data corruption in the data latches; the prefetch logic prevents dlmt from going high until tlhe next prefetch when a mode change from SAM to HOM occurred during a host port SAM read and the processor does a read to the same page before the end of the first byte of the next access.

A memory prefetch signal 2020 is used as the input to the master clock portion of a PRFTCHD latch 2022. The memory prefetch signal 2020 is generated as the output of an OR gate 2024 whose two inputs are the output of a two input AND gate 2026 and the output (address write) of a three input AND gate 2028. The inputs to the two input AND gate 2026 are ctl2 and ctl0. The inputs to the three input AND gate 2028 are ctl0 inverted (by inverter 2030), ctl1, and ctl2 inverted (by inverter 1044). The output of the slave portion of the PRFTCHD latch 2022 generates the actual prftchd control signal 2004, which also serves as the input to the master portion of a PRFTCHDD latch 2032. Both the PRFTCHD 2022 and PRFTCHDD 2032 latches are locked by the hlmt and/or hlst clock signals.

The output signal from the master clock portion of the PRFTCHDD latch 2032 serves as one input to a two input AND gate 2034, that along with two other AND gates 2036, 2038 serve to generate the control signals for operating the data latch input mux 2210; the other inputs to this set of three AND gates 2034, 2036, 2038 are the output of a two input AND gate 2040 (whose output signal corresponds to a host data write) and either an ms or ls control signal. The ms and ls control signals correspond to the most significant (high) byte first or the least significant (low) byte first, respectively, and are generated by logic depicted in FIG. 11D, and discussed later herein.

A similarly delayed data write control signal (datawrd) 2016 is used to allow the write to memory to occur, even if csds falls early and the transaction mode changes. The datawrd control signal 2016 is used to control a tristatable output driver 2206 for driving the signals on memdout 2100 to the memory interface host port memory data lines (hpimd) 1506.

A host data write signal from AND gate 2040 is used as the input to the master clock portion of a DATAWRD latch 2042. The host data write signal is the output of two input AND gate 2040 whose two inputs are ctl0 and ctl2 inverted. The host data write signal is also used in combination with other control signals for controlling the data latch input mux 2210, as noted earlier hereinabove.

The output of the slave portion of the DATAWRD latch 2042 generates a datawr control signal 2006, which also serves as the input to the master portion of a DATWRDD latch 2046. The datawr control signal 2006 is used, along with other control signals, in the clocks block 702 of the host port circuitry to generate the dlmt clock signal 1100. Both the DATAWRD 2042 and DATAWRDD 2046 latches are clocked by the hlmt and/or hlst clock signals.

The output signal from the master clock portion of the DATAWRDD latch 2046 serves as one input to a two input AND gate 2048 that generates the datawrd control signal 2016, and serves as one input to an OR gate 2050 that generates, after inversion (by inverter 2052), the memory read or write control signal (hpimrnw) 2014. The other input to this OR gate 2050 and AND gate 2048 is the datawr signal 2006.

The datawr signal 2006 is also combined with the prftchd signal in an OR gate 2054 whose output is the input to the master clock portion of a MEMACCDD latch 2056; this OR gate's output also serves as a memory access control signal (memaccd) 2010. The output of the slave clock portion of the MEMACCDD latch 2056 is provided as a memory access control signal (memaccdd) 2012, after two serial inverters 2058, 2060 for signal shaping and stabilization.

An address read control signal is generated as the output of a three input AND gate 2062 whose inputs are ctl0 invered, ctl1, and ctl2. This address read control signal is used (normal or inverted by inverter 2086) in combination with the ms and ls signals in a set of three AND gates 2064, 2066, 2068 that are used to supply the control signals to operate the data/address output mux 2280.

A host read control signal is generated by using the control signal ctl2. This ctl2 signal is output as a control signal (hden) 2070 which is combined with csds_ in a two input AND gate 2072. The output of this AND gate 2072 is inverted (by inverter 2074) to provide a control signal (hpirden) which is used to control the tristatable output driver 2076 for the hdout lines 402o.

An auto-increment control signal is generated as the output of a two input AND gate 2080 whose inputs are ctl0 and ctl1 inverted. This auto-increment control signal is supplied as one input to a two input AND gate 2082 whose output is used to control a portion of the address latch input mux 2260.

A control register write control signal is generated as the output of a three input AND gate 2084 whose inputs are ctl1 inverted (by inverter 2086), ctl2 inverted, and ctl0 inverted. This control register write control signal is combined with hbil inverted (by inverter 2088) and the [2] line of hdin in a three input AND gate 2090; the output of this AND gate 2090 is used with a mint signal in an OR gate 2622 (See FIG. 11B). The output of this OR gate 2622 is supplied as one input to a three input AND gate 2620 whose output is an interrupt control signal (mintin) to MINT latch 2640 via AND gate 2642; the other two inputs to this AND gate 2620 are minter inverted (by inverter 2626) and the system reset 1900 inveeted by inverter 2624.

The control register write control signal is also cobined with hbil inverted and the [3] line of hdin in a three input AND gate 2092; the output of this AND gate 2092 is combined with a spinte signal in an OR gate 2634. The output of this OR gate 2634 is supplied as one input to a three input AND gate 2630 whose output is an interrupt control signal (spintcin); the other two inputs to this AND gate 2630 are spintcclr inverted (by inverter 2632) and the system reset 1900 inverted.

The control register write control signal is also used as a control signal for controlling the bob input mux 2300.

A control register read control signal is generated as the output of a three input AND gate 2094 whose inputs are ctl1 inverted, ctl2, and ctl0 inverted. The control register read control signal is used as a control signal for controlling the host input muix 2290. The address latch input mux 2260 is controlled by control signals from three AND gates 2082, 2094, 2096. The inputs to AND gate 2082 are the hbil signal inverted and the autoincrement signal from AND gate 2080. The inputs to AND gate 2094 are the address write signal from AND gate 2028 and the ms signal The inputs to AND gate 2096 are the address write signal from AND gate 2028 and the ls signal.

The hbil control signal is also supplied as an input to the master clock portion of a FLAG latch 2410. The output of the master clock portion of the FLAG latch 2410 is used, after shaping and stabilizing in two serial inverters 2412, 2414, as a control signal flaghm 2000.

The output of the slave portion of the FLAG latch 2410 flaghs is used in various logical combinations with the output 2312s of the slave portion of the BOB latch 2310 to generate the ms and is signals. Again, the ms and Is signals correspond to the most significant (high) byte first or the least significant (low) byte first, respetively.

More particularly, the ms signal is the output of OR gate 2438 and the Is signal is the output of OR gate 2440. The inputs to OR gate 2438 are the outputs of AND gate 2436 and AND gate 2434. The inputs to OR gate 2440 are the outputs of AND gate 2432 and AND gate 2430. The inputs to AND gate 2436 are the flaghs signal 2002 inverted by inverter 2442 and the slave output 2312s of the BOB latch 2310. The inputs to AND gate 2434 are the flaghs signal 2002 and the slave output 2312s of the BOB latch 2310, inverted by inverter 2444. The inputs to AND gate 2432 are the fiaghs signal 2002, inverted by inverter 2446 and the slave output 2312s of the BOB latch 2310, inverted by inverter 2448. The inputs to AND gate 2430 are the flaghs signal 2002 and the slave output 2312s of the BOB latch 2310.

The output of the slave portion of the FLAG latch 2410 is also provided as an output control signal (flaghs) 2002, after a double inversion by inverters 2416, 2418, which is used as a control signal (in other portions of the host port circuitry) for synchronizing memory accesses in the SAM mode. That is, a control signal (flag) that toggles on hlst's rising edge is used to synchronise the host clork signals with the processor clock signals; more particularly, the rising edge of HDS goes into the synchronizer SYNC 1550 (and then subsequent latches SYNCD, SYNCDD) to provide the desired memory access signals.

The SMODE_L 2600 and SMODE 2602 latches serve to store or hold the value of the smode bit. The input smode value is supplied to the slave portion of the SMODE_L latch 2600 whose output is the input to the master clock portion of the SMODE latch 2602. The output of the master clock portion of the SMODE latch 2602 is supplied as the [1] line input for the host input mux 2290, whose output, via the tristatable output driver 2076, is the input for the hdout lines 402o.

The SPINT_L 2612 and SPINT 2614 latches serve to store or hold the value of the spint bit (HINT or host interrupt). The input spint value is supplied to the slave portion of the SPINT_L latch 2612 whose output is the input to the master clock portion of the SPINT latch 2614. The input spint value is inverted by inverter 2618 and provided as an interrupt control signal to the host processor (hpi_int) 134b. The output of the master clock portion of the SPINT latch 2614 is supplied as the [3] line input for the host input muxc 2290. As depicted, the reiing mux 2290 inputs are line inputs [2] and [4–7] which are grounded to provide a zero signal on these lines to the host processor 400.

A MINT latch 2640 stores the value of the host interrupt (DSPINT) for the processor 300. The input for the master clock portion of the MINT latch 2640 is output of a two mput AND gate 2642 whose inputs are the mintin signal from AND gate 2620 and the cregset signal 1512, inverted by inverter 2644. The host 400 interrupts the processor 300 by writing a one to the DSPINT (bit position 2) of control register 150. This is accomplished when the host 400 selects hcntlo as a zero, hcntl1 as a zero and hrw as a zero for a control register write access. The interrupt is a one written on line [2] of the hdin bus 402i, where it propagates to AND gate 2090 and is combined with the control register read signal from gate 2084 and the inverted hbil signal; from gate 2090 it goes to OR gate 2626 and then to AND gate 2620 where it becomes the mintin signal supplied to AND gate 2642.

The output of the slave clock portion of the MINT latch 2640 is provided, after inversion by inverter 2646, as an output control signal (hpimint) 2016 to the processor for a wakeup from "idle" and as an internal control signal (mint) for synchronization (via MSYNC latch 1600 in FIG. 11G) with the processor clocks. The mint signal preferably is high long enough to be sampled by the synchronizer and the synchronizer is allowed to reset before the next host access to avoid missing the next interrupt; also, hpimint preferably is low long enough to wake up the processor 300 from IDLE. The HRDY logic serves to ensure that these actions occur. The MINT latch 2640 is automatically set to zero right after a reset by cregset 1512, is set to one by a write when HD[2] is a one on the first byte, and clears itself after the second byte of a write using the mintclr signal.

Similarly, a SPINTC latch 2650 stores the spintc value. The input for the master clock portion of the SPINTC latch 2650 is output of a two input AND gate 2652 whose inputs are the spintcin signal from AND gate 2630 and the cregset signal 1512. The output of the slave clock portion of the SPINTC latch 2650 is provided as an output control signal (spintc) to the processor. The SPINTC latch 2650 is automatically set to zero right after a reset by cregset 1512, is set to one by a write when HD[3] is a one on the first byte, and clears itself after the second byte of a write using the spintclr signal; this allows the processor 300 to interrpt the host 400 again, as soon as possible. The master clock portion of both the MINT and SPINTCM latches are clocked by a signal output by an OR gate 2654 whose two inputs are hlmt 1050 and the output of a three input AND gate 2656; the inputs for the three input AND gate 2656 are cregset 1512, lmt 1060, and hpitest 1044b inverted by inverter 2658; the slave portions of these two latches are clocked by the hlst clock signal 1052.

Figure 11I:
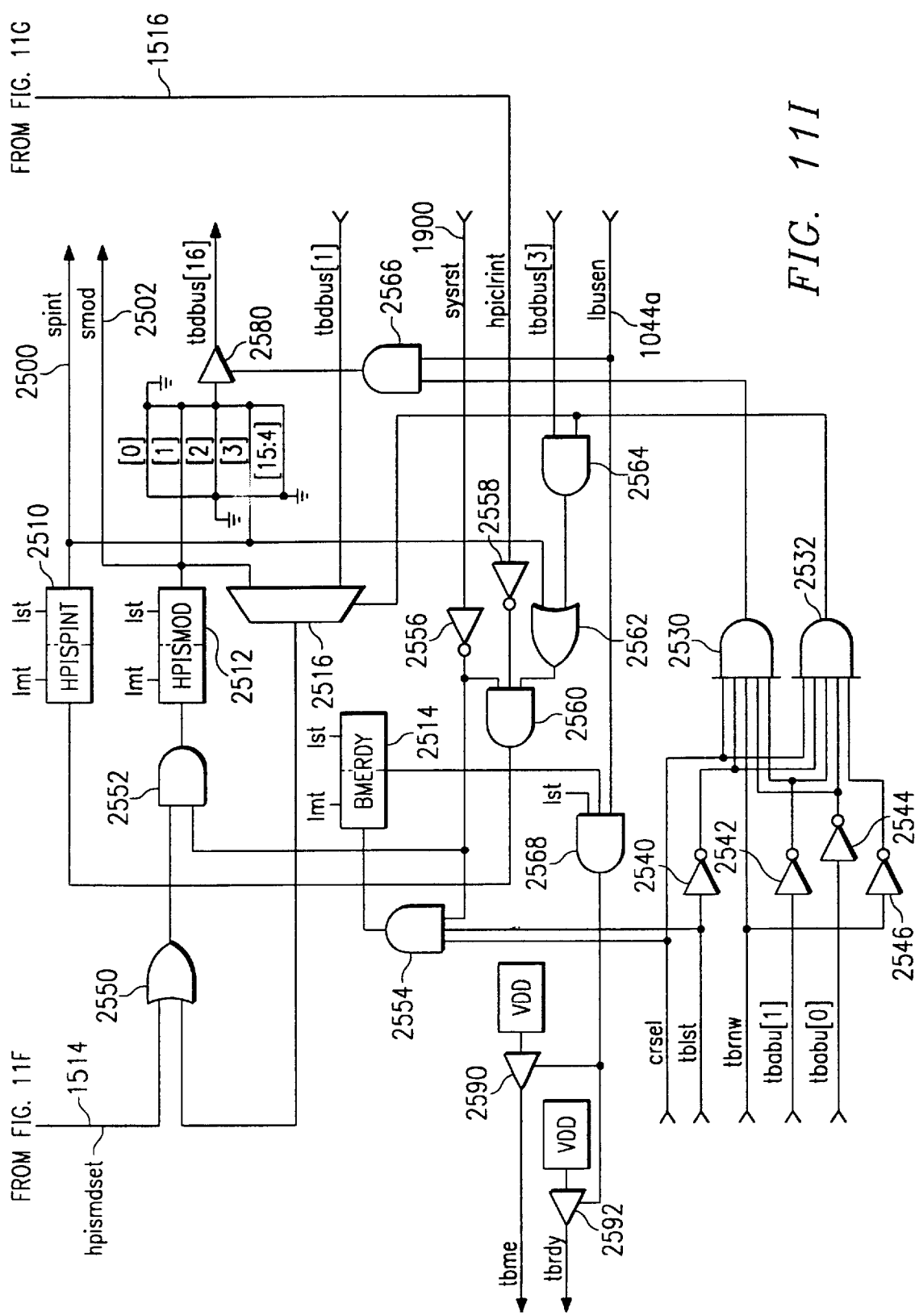
Figure 11J:
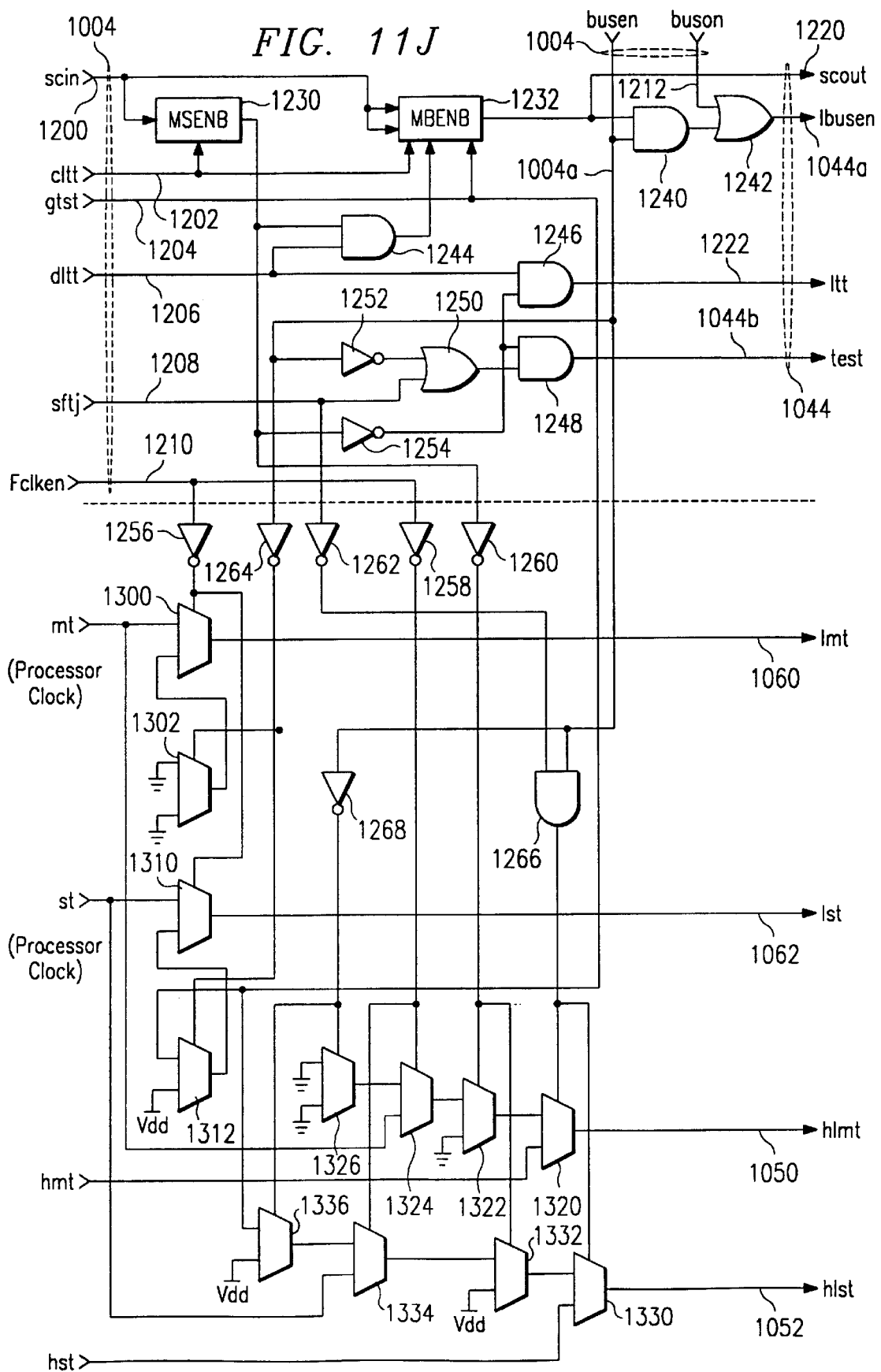

Referring now to FIG. 11I, there maybe seen a portion of the circuitry of the host port circuit that is associated with the control register 708. The components with 26XX item numbers in FIGS. 11A–11D are part of the control register circuitry 708, but were indluded in these Figures for ease of discussion purposes. Also, for ease of discussion purposes the latches in FIG. 11I associated with the control register are depicted in FIG. 11I; preferably, these latches are included as part of the memory interface portion of the host port circuit.

As depicted in FIG. 11I, the HPISPINT latch 2510 has as an input to its master clock portion the output of a three input AND gate 2560; the inputs for this AND gate 2560 are the system reset signal (sysrst) 1900 inverted by inverter 2556, a host processor clearing the interrupt from the processor signal (hpiclrint) inverted by inverter 2558, and the output of a two input OR gate 2562. The two inputs to the OR gate 2562 are the output of the slave portion of the HPISPINT latch 2510 and the output of a two input AND gate 2564; the two inputs to this AND gate 2564 are the memory bus line [3] and the output of a first five input AND gate 2532. the five inputs for this AND gate 2532 are a control register select signal (crsel), a memory bus first cycle control signal (tblst) inverted by inverter 2540, a memory bus read/write control signal (tbrnw) inverted by inverter 2546, a memory address bus line [1] inverted by inverter 2542, and a memory address bus line [0] inverted by inverter 2544.

The output from the slave portion of the HPISPINT latch 2510 is provided as an output interrupt control signal (spint) 2500 to interrupt the host processor 300 (after inversion by inverter 2618 in FIG. 11A) and as an internal signal for use as line [3] for the memory data bus (tbdbus), via an output driver 2580; the output driver 2580 is controlled by an output signal from a two input AND gate 2566 whose inputs are a local bus enable signal (lbusen) 1044a and the output of a second five input AND gate 2530. The five inputs for this AND gate 2530 are a control register select signal (crsel), a memory bus first cycle control signal (tblst) inverted, a memory bus read/write control signal (tbrnw), a memory address bus line [1] inverted, and a memory address bus line [0] inverted.

As depicted in FIG. 11L, the HPISMOD latch 2512 has as an input to its master clock portion the output of a two input AND gate 2552; the inputs for this AND gate 2552 are the system reset signal (sysrst) 1900 inverted and the output of a two input OR gate 2550. The inputs for the OR gate 2550 are an smode reset signal (hpismodset) 1514 and the output of a multiplexer 2516. The mux's 2516 inputs are the output from the slave portion of the HPISMOD latch 2512 and a memorybus line [1] (tbdbus[1]). The mux 2516 is controlled by the output of the first five input AND gate 2532 described hereinabove. The output from the slave clock portion of the HPISMOD latch 2512 is also provided as an output signal (smod) 2502 and as an internal signal for use as line [1] for the memory data bus (tbdbus), via the output driver 2580. Both the HPISPINT latch and the HPISMOD latch are clocked by the lmt and lst clock signals.

The processor 400 reads the smod and spit bit values stored in the HPISMOD 2512 and HPISPINT 2510 latches, via the memory bus (tbdbus), as the bits on memory bus lines [1] and [3], respectively, the remainder of the memory bus lines will be read as zero. During a write to the control register, the host dear signal (hpiclrint) has priority. Upon reset hpispint is set to zero. The smod bit is set to zero during reset and then set to one on the falling edge of the system reset signal (sysrst) 1900. When the HPISMOD or HPISPINT latch is read by the host 400, it is first synchronised back to the host clocks (see FIG. 11A) to keep the signal from changing during the read.

The BMHRDY latch 2514 has an input for its master clock portion that is the output of a three input AND gate 2554. This AND gate's 2554 inputs are the system reset signal (syrst) 1900 inverted, the control register select signal (crsel), and a memory bus first cycle control signal (tblst). The output of the master portion of the BMHRDY latch is supplied as one input to a three input AND gate 2568 whose output controls two drivers 2590, 2592, one for a memory bus control signal (tbme) and one a memory bus ready signal (tbrdy). These signals and latch 2514 are associated with the memory bus interface protocols and are able to be modified to suit other bus protocols and still be within the scope of the present invention. The other inputs to AND gate 2568 are lst 1052 and lbusen 1044a. The master clock portion of the BMHRDY latch 2514 is locked by the lmt clock signal.

Figure 12:
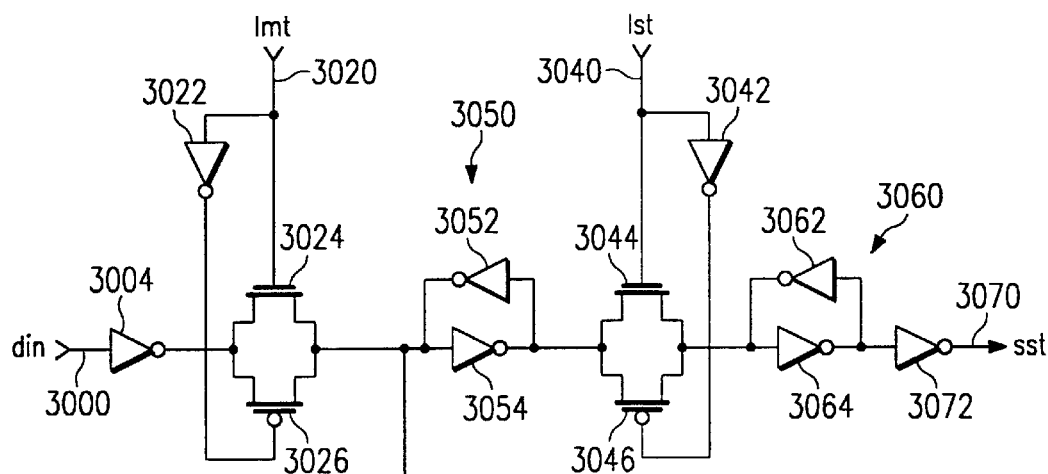
FIG. 12 depicts a detailed circuit for a scannable register latch (SRL) employed in the host port interface of the present invention.

Referring now to FIG. 12, there may be seen a presently preferred circuit for an SRL employed in the host port of the present invention. More particularly, it may be seen from FIG. 12 that the SRL has two inputs, din 3000 and scn 3002. The din input 3000 corresponds to the normal functional operation of the SRL wbile the scn input 3002 is for use when the SRL is in its test mode. The lmt 3020 and lst 3040 clock signas represent normal finional clock signals. The ltt 3030 test clock signal is used to clock the SRL in the test mode. The output from the SRL is the sst signal 3070, which corresponds to a normal or functional logic output when not in the test mode and a test mode output when in the test mode. As may be seen, each of the two inputs 3000, 3002 for the master side 3050 of the latch is connected to or isolated from the latch input 3000 or 3002 by a pair of n and p channel FETs 3024, 3026 or 3034, 3036 that are connected in parallel between the inputs inverted by inverter 3004 or 3006 and the inputs to the two reverse connected inverters 3052, 3054 that serve as the master latch 3050. These FETs are gated by an appropriate clock signal (lmt 3020 or ltt 3030). The slave portion 3060 of the latch only has one input, from the output of the master latch 3050, but again it is isolated from this input by a pair of FETs 3044, 3046 connected in parallel. Again, the actual slave latch 3060 is a pair of reverse connected inverters 3062, 3064. The output of the slave latch 3060 is inver by inverter 3072 and provided as the output 3070 for the SRL. In addition, some SRLs employed in the host port have an output (not depicted) from the maser portion 3050 of the latch The circuit 100 also includes a test logic circuit 144 for providing a test clock signal to all the circuitry to be teste whether synchronous or asynchronous. As may be seen in FIG. 1, there are dotted or dashed lines connecting the various blocks of circuitry that represent the scan-in and scan-out path for data to SRLs in these blocks for testing purposes. The shifting of test data into the SRLs in the blocs via a scan path is controlled by the test logic 144. All of the circuitry of circuit 100 is fully scannable, except for the HBIL, HCNTL0, HCNTL1, and HRW latches (See FIG. 11E). However, these four latches are directly connected to an input pin and have clocks controllable from other input pins, and so are fully testable.

Figure 13:
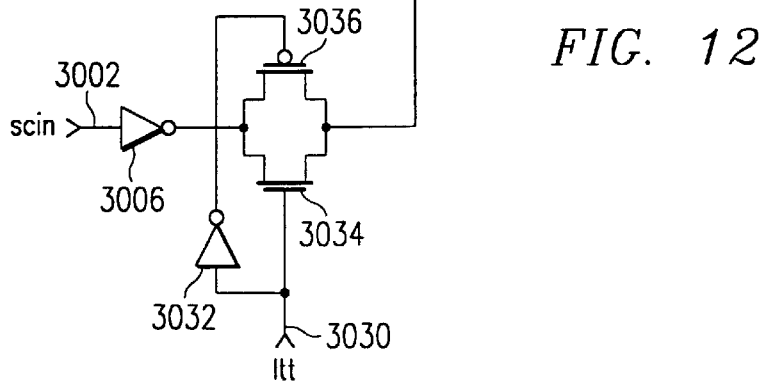
FIG. 13 depicts a summary circuit for test circuitry employed in the host port interface of the present invention.
Figure 13:
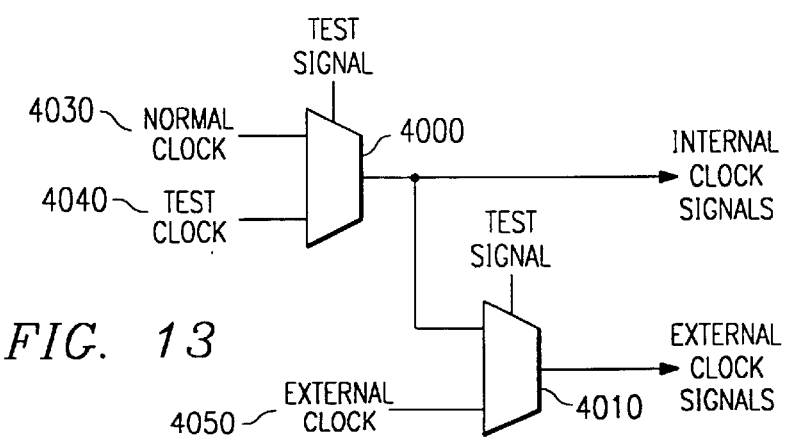

Referring now to FIG. 13, it may be seen a summary portion of the the test circuitry 144 depicted more fully in FIG. 11J. This circuitry includes two multiplexers 4000, 4010 that are used to select between clocks for test functions and clocks for normal functions. The first multiplexer 4000 selects between the normal internal functional clock 4030 and a test clock 4040 for that portion of the circuitry of circuit 100 that uses internal or synchronous clock signals. The second multiplexer selects between the external clock 4050 and the output of the first mux clock 4000, which during tseting is the "test" clock 4040 for that portion of the circuitry that uses external or asynchronous clock signals, or the normal functional clock signal 4030 for other types of testing. In this manner, when the circuit 100 is in the test mode the internal clock signal 4030 or test clock 4040 may be supplied to all the circuitry of circuit 100 whether normally clocked by synchronous or asynchronous clocked signals.

A preliminary specification for the presently preferred embodiment of the present invention is attached hereto as an Appendix.

The present invention is capable of being implemented in software, hardware, or combinations of hardware and software. Although the present invention and its advantages have been described in detail, it should be understood that various changes, substitutions and alterations may be made herein without departing from the spirit and scope of the invention, as defined in the appended claims.

What is claimed is:

1. A test circuit for controlling the testing of a circuit having portions using either synchronous or asynchronous clock signals, comprising:

a first multiplexer for selectively providing as an output either said synchronous clock signal or a test clock signal to said portion of said circuit using said synchronous clock signal, and a second multiplexer for selectively providing said output from said first multiplexer or said asynchronous clock signal to said portion of said circuit using said asynchronous clock signal.

* * * * *